(12) United States Patent
Ouchi et al.

(10) Patent No.: US 10,498,374 B2
(45) Date of Patent: Dec. 3, 2019

(54) TERMINAL DEVICE, BASE STATION APPARATUS, METHOD IN TERMINAL DEVICE, AND METHOD IN BASE STATION APPARATUS

(71) Applicant: SHARP KABUSHIKI KAISHA, Osaka-shi, Osaka (JP)

(72) Inventors: Wataru Ouchi, Osaka (JP); Kazuyuki Shimezawa, Osaka (JP); Toshizo Nogami, Osaka (JP); Shoichi Suzuki, Osaka (JP); Kimihiko Imamura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 115 days.

(21) Appl. No.: 15/031,190

(22) PCT Filed: Oct. 24, 2014

(86) PCT No.: PCT/JP2014/078371
§ 371 (c)(1),
(2) Date: Apr. 21, 2016

(87) PCT Pub. No.: WO2015/060433
PCT Pub. Date: Apr. 30, 2015

(65) Prior Publication Data
US 2016/0261296 A1    Sep. 8, 2016

(30) Foreign Application Priority Data
Oct. 25, 2013    (JP) ................................. 2013-221791

(51) Int. Cl.
*H04B 1/10* (2006.01)
*H04L 5/14* (2006.01)
(Continued)

(52) U.S. Cl.
CPC ................. *H04B 1/10* (2013.01); *H04L 5/14* (2013.01); *H04W 72/0446* (2013.01); *H04W 72/12* (2013.01); *H04W 84/045* (2013.01)

(58) Field of Classification Search
CPC ........ H04B 1/10; H04L 5/14; H04W 72/0446; H04W 72/12; H04W 84/045
See application file for complete search history.

(56) References Cited

U.S. PATENT DOCUMENTS 9,538,565 B2 *    1/2017    He ........................ H04W 76/38
9,628,983 B2 *    4/2017    Kim ........................ H04W 8/22
(Continued)

FOREIGN PATENT DOCUMENTS

WO    WO 2012/142123 A2    10/2012
WO    WO 2013/077554 A1    5/2013

OTHER PUBLICATIONS

3GPP TS 36.211 V8.8.0, "3rd Generation Partnership Project; Technical Specification Group Radio Access Network; Evolved Universal Terrestrial Radio Access (E-UTRA); Physical Channels and Modulation (Release 8)", (Sep. 2009).
(Continued)

*Primary Examiner* — Luat Phung
(74) *Attorney, Agent, or Firm* — Birch, Stewart, Kolasch & Birch, LLP

(57) ABSTRACT

According to an aspect of the present invention, there is provided a terminal device that communicates with a base station apparatus, the terminal device including: a transmission unit that does not transmit an uplink signal in a secondary cell on the same subframe as a subframe, if the subframe in a primary cell is assumed to be a downlink subframe, in a case where multiple cells that include at least a cell in a first frame structure type (FDD) and a cell in a second frame structure type (TDD) are aggregated, different TDD UL/DL configurations are set in each of the multiple
(Continued)

cells in the second frame structure type, and a function of performing transmission and reception at the same time between cells in the second frame structure type for which the different TDD UL/DL configurations are set is not retained.

7 Claims, 5 Drawing Sheets

(51) Int. Cl.
*H04W 72/04* (2009.01)
*H04W 72/12* (2009.01)
*H04W 84/04* (2009.01)

(56) References Cited

U.S. PATENT DOCUMENTS

| | | | |
|---|---|---|---|
| 9,705,641 B2* | 7/2017 | Liang | H04L 1/1812 |
| 2012/0257552 A1 | 10/2012 | Chen et al. | |
| 2012/0294203 A1* | 11/2012 | Koorapaty | H04L 1/0002 370/280 |
| 2013/0039232 A1* | 2/2013 | Kim | H04L 5/14 370/280 |
| 2013/0128832 A1* | 5/2013 | Kang | H04W 72/042 370/329 |
| 2014/0328228 A1 | 11/2014 | Park et al. | |
| 2015/0036631 A1* | 2/2015 | Yang | H04W 72/0446 370/329 |
| 2015/0085713 A1* | 3/2015 | He | H04W 76/38 370/280 |
| 2015/0295681 A1* | 10/2015 | Liang | H04L 1/1812 370/280 |
| 2016/0164622 A1* | 6/2016 | Yi | H04B 7/2656 370/280 |
| 2016/0212786 A1* | 7/2016 | Hwang | H04B 7/2656 |

OTHER PUBLICATIONS

3GPP TS 36.300 V10.10.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 19)", (Jun. 2013).

3GPP TS 36.306 V11.4.0, "3rd Generation Partnership Project; Technical Specification Group Radio Access Network; Evolved Universal Terrestrial Radio Access (E-UTRA); User Equipment (UE) radio access capabilities (Release 11)", (Sep. 2013).

Catt, "7.2.3.1 PDSCH timing with TDD as PCell for FDD-TDD CA", 3GPP TSG RAN WG1 Meeting #74bis, R1-134095, Guangzhou, China, Oct. 7-11, 2013.

Catt, "7.2.3.1 PUSCH timing with TDD as PCell for FDD-TDD CA", 3GPP TSG RAN WG1 Meeting #74bis, R1-134096, Guangzhou, China, Oct. 7-11, 2013.

Huawei, Hisilicon, "7.2.5.2 Potential solutions of TDD-FDD joint operation", 3GPP TSG RAN WG1 Meeting #74, R1-132886, Barcelona, Spain, Aug. 19-23, 2013.

Nokia Siemens Networks, Nokia Corporation, Catt, 6.2 DRX operation for EPDCCH monitoring, 3GPP TSG-RAN WG2 Meeting #81bis, R2-131084, Chicago, USA, Apr. 15-19, 2013.

Qualcomm Incorporated, "7.2.3.1 Solutions for TDD-FDD CA", 3GPP TSG RAN WG1 #74bis, R1-134610, Guangzhou, China, Oct. 7-11, 2013.

Catt: "Parallel PUCCH transmission for FDD-TDD carier aggregation", 3GPP Draft, R1-134098, 3rd Generation Partnership Project, 3GPP TSG RAN WG1 Meeting #74bis, Guangzhou, China, Oct. 11, 2013.

Ericsson: "Detection of duplex", TSG-RAN WG1 #52, 3GPP Draft, R1-080888, 3rd Generation Partnership Project (3GPP), vol. 1, Sorrento, Italy, Feb. 6, 2008.

Huawei et al.: "Details of TDD-FDD CA", 3GPP TSG RAN WG1 Meeting #74bis, Guangzhou, China, R1-134056, Oct. 11, 2013.

3GPP TSG-RAN WG1#72b R1-131225, "Reference configuration method for dynamic UL-DLreconfiguration[online]", Nokia Siemens Networks, Nokia, Apr. 15, 2013.

3GPP TSG-RAN WG1#74 R1-133373, Discussion on scenarios and UE requirements for TDD-FDD joint operation [online], LG Electronics, Aug. 19, 2013.

3GPP TSG RAN WG1 Meeting #74, "Potential Solutions for LTD FDD-TDD joint operation", Barcelona, Spain, Aug. 19-23, 2013, R1-133022, 2 pages.

* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Special subframe    U Uplink subframe    D Downlink subframe

TERMINAL DEVICE, BASE STATION APPARATUS, METHOD IN TERMINAL DEVICE, AND METHOD IN BASE STATION APPARATUS

TECHNICAL FIELD

The present invention relates to a terminal device, a base station apparatus, a method for use in the terminal device, and a method for use in the base station apparatus.

This application claims the benefit of Japanese Patent Application 2013-221791 filed on Oct. 25, 2013, the entire contents of which are incorporated herein by reference.

BACKGROUND ART

In communication systems approved by the Third Generation Partnership Project (3GPP), such as Wideband Code Division Multiple Access (WCDMA: a registered trademark), Long Term Evolution (LTE), and LTE-Advanced (LTE-A), or in communication systems approved by the Institute of Electrical and Electronics Engineers (IEEE), such as Wireless Local Area Network (WLAN) and Worldwide Interoperability for Microwave Access (WiMAX), a base station apparatus (a cell, a first communication apparatus (a communication apparatus that is different from a terminal device), or an eNodeB) and a terminal device (a mobile terminal, a mobile station apparatus, a second communication device (a communication device that is different from the base station apparatus), user equipment (UE), a user device) each include multiple transmit and receive antennas, and, by using a Multi Input Multi Output (MIMO) technology, space-multiplex a data signal and realize high-speed data communication.

Furthermore, in 3GPP, in order to realize high-speed data communication between the base station apparatus and the terminal device, carrier aggregation (CA) in which the communication is performed at the same time using multiple component carriers is employed (NPL 1).

In 3GPP, as a frame structure type in compliance with a bidirectional communication scheme, Frequency Division Duplex (FDD) and Time Division Duplex (TDD) are employed. Furthermore, in FDD, a full duplex scheme in which bidirectional communication is possible at the same time and a half duplex scheme in which the bidirectional communication is realized by switching from one direction communication to another direction communication (NPL 2) are employed. Moreover, in some cases, LTE in which TDD is employed is referred to as TD-LTE or LTE TDD.

Furthermore, in 3GPP, TDD-FDD carrier aggregation (TDD-FDD CA) is considered in which a component carrier (TDD carrier) that supports TDD and a component carrier (FDD carrier) that supports FDD are aggregated and communication is performed (NPL 3).

CITATION LIST

Non Patent Literature

NPL 1: 3rd Generation Partnership Project Technical Specification Group Radio Access Network; Evolved Universal Terrestrial Radio Access (E-UTRA) and Evolved Universal Terrestrial Radio Access Network (E-UTRAN); Overall description; Stage 2 (Release 10), TS36.300 v10.10.0 (2013-06).

NPL 2: 3rd Generation Partnership Project Technical Specification Group Radio Access Network; Evolved Universal Terrestrial Radio Access (E-UTRA); Physical Channels and Modulation (Release 8), TS36.211 v8.8.0 (2009-09). NPL 3: "Potential solutions of TDD-FDD joint operation", R1-132886, 3GPP TSG-RAN WG1 Meeting #74, Barcelona, Spain, 19-23 Aug. 2013.

SUMMARY OF INVENTION

Technical Problem

Because interference between the components that results from performing carrier aggregation using the TDD carrier and the FDD carrier increases, there occurs a problem in that suitable communication is not performed.

An object of the present invention, which is made in view of the problem described above, is to provide a terminal device that is capable of performing suitable communication.

Solution to Problem (1) According to an aspect of the present invention, there is provided a terminal device that communicates with a base station apparatus, the terminal device including: a transmission unit that does not transmit an uplink signal in a secondary cell on the same subframe as a subframe, if the subframe in a primary cell is assumed to be a downlink subframe, in a case where multiple cells that include at least a cell in a first frame structure type (FDD) and a cell in a second frame structure type (TDD) are aggregated, different TDD UL/DL configurations are set in each of the multiple cells in the second frame structure type, and a function of performing transmission and reception at the same time between cells in the second frame structure type for which the different TDD UL/DL configurations are set is not retained.

(2) The terminal device that is described in (1) may further include a reception unit that does not receive a downlink signal in the secondary cell on the same subframe as the subframe, if the subframe in the primary cell is assumed to be an uplink subframe.

(3) The terminal device that is described in (1) may further include a reception unit that does not receive a PDSCH/EPDCCH/PMCH/PRS in the secondary cell on a certain subframe, if the certain subframe is assumed to be a special subframe in the primary cell and to be the downlink subframe in the secondary cell.

(4) The terminal device that is described in (1) may further include a reception unit that does not receive any signal on an OFDM symbol of the secondary cell that overlaps an UpPTS or a guard period in the primary cell, on a certain subframe, if the certain subframe is assumed to be a special subframe in the primary cell and to be the downlink subframe in the secondary cell.

(5) According to another aspect of the present invention, there is provided a base station apparatus that communicates with a terminal device, the base station apparatus including a reception unit that does not receive an uplink signal in a secondary cell on the same subframe as a downlink subframe in a primary cell, in a case where different frame structure types that include at least a first frame structure type (FDD) and a second frame structure type (TDD) are set for multiple cells that are aggregated and different TDD UL/DL configurations are set for multiple cells in the second frame structure type, among the multiple cells, and in a case where the terminal device does not retain a function of performing transmission and reception at the same time between cells in the second frame structure type.

(6) The base station apparatus that is described in (5) may further include a transmission unit that does not transmit a downlink signal in the secondary cell on the same subframe, if the subframe in the primary cell is assumed to be an uplink subframe.

(7) The base station apparatus that is described in (5) may further include a transmission unit that does not transmit a PDSCH/EPDCCH/PMCH/PRS in the secondary cell on a certain subframe, if the certain subframe is assumed to be a special subframe in the primary cell and to be the downlink subframe in the secondary cell.

(8) The base station apparatus that is described in (5) may further include a transmission unit that does not transmit any signal on an OFDM symbol of the secondary cell that overlaps an UpPTS or a guard period in the primary cell, on a certain subframe, if the certain subframe is assumed to be a special subframe in the primary cell and to be the downlink subframe in the secondary cell.

(9) According to still another aspect of the present invention, there is provided a method for use in a terminal device that communicates with a base station apparatus, the method including: a step of not transmitting an uplink signal in a secondary cell on the same subframe as a subframe, if the subframe in a primary cell is assumed to be a downlink subframe, in a case where multiple cells that include at least a cell in a first frame structure type (FDD) and a cell in a second frame structure type (TDD) are aggregated, different TDD UL/DL configurations are set in each of the multiple cells in the second frame structure type, and a function of performing transmission and reception at the same time between cells in the second frame structure type for which the different TDD UL/DL configurations are set is not retained; a step of not receiving a downlink signal in the secondary cell on the same subframe as the subframe if a subframe in the primary cell is assumed to be an uplink subframe; and a step of not receiving any signal on an OFDM symbol of the secondary cell that overlaps an UpPTS or a guard period in the primary cell, on a certain subframe, if the certain subframe is assumed to be a special subframe in the primary cell and to be the downlink subframe in the secondary cell.

(10) According to still another of the present invention, there is provided a method for use in a base station apparatus that communicates with a terminal device, the method including: a step of not receiving an uplink signal in a secondary cell on the same subframe as a downlink subframe in a primary cell, in a case where different frame structure types that include at least a first frame structure type (FDD) and a second frame structure type (TDD) are set for multiple cells that are aggregated and different TDD UL/DL configurations are set for multiple cells in the second frame structure type, among the multiple cells, and in a case where the terminal device does not retain a function of performing transmission and reception at the same time between cells in the second frame structure type; a step of not transmitting a downlink signal in the secondary cell on the same subframe if a subframe in the primary cell is an uplink subframe; a step of not transmitting a PDSCH/EPDCCH/PMCH/PRS in the secondary cell on a certain subframe, if the certain subframe is assumed to be a special subframe in the primary cell and to be the downlink subframe in the secondary cell; and a step of not transmitting any signal on an OFDM symbol of the secondary cell that overlaps an UpPTS or a guard period in the primary cell, on the certain subframe, if the certain subframe is assumed to be the special subframe in the primary cell and to be the downlink subframe in the secondary cell.

Accordingly, the terminal device can perform suitable transmission control and reception control.

Advantageous Effects of Invention

According to the aspects of the present invention, in a communication system in which a base station apparatus and a terminal device communicate with each other, the terminal device performs suitable transmission control and reception control and thus communication efficiency can be improved.

BRIEF DESCRIPTION OF DRAWINGS

FIG. 3 is a diagram illustrating a configuration of a subframe pattern in a TDD UL/DL configuration.

DESCRIPTION OF EMBODIMENTS

Figure 1:
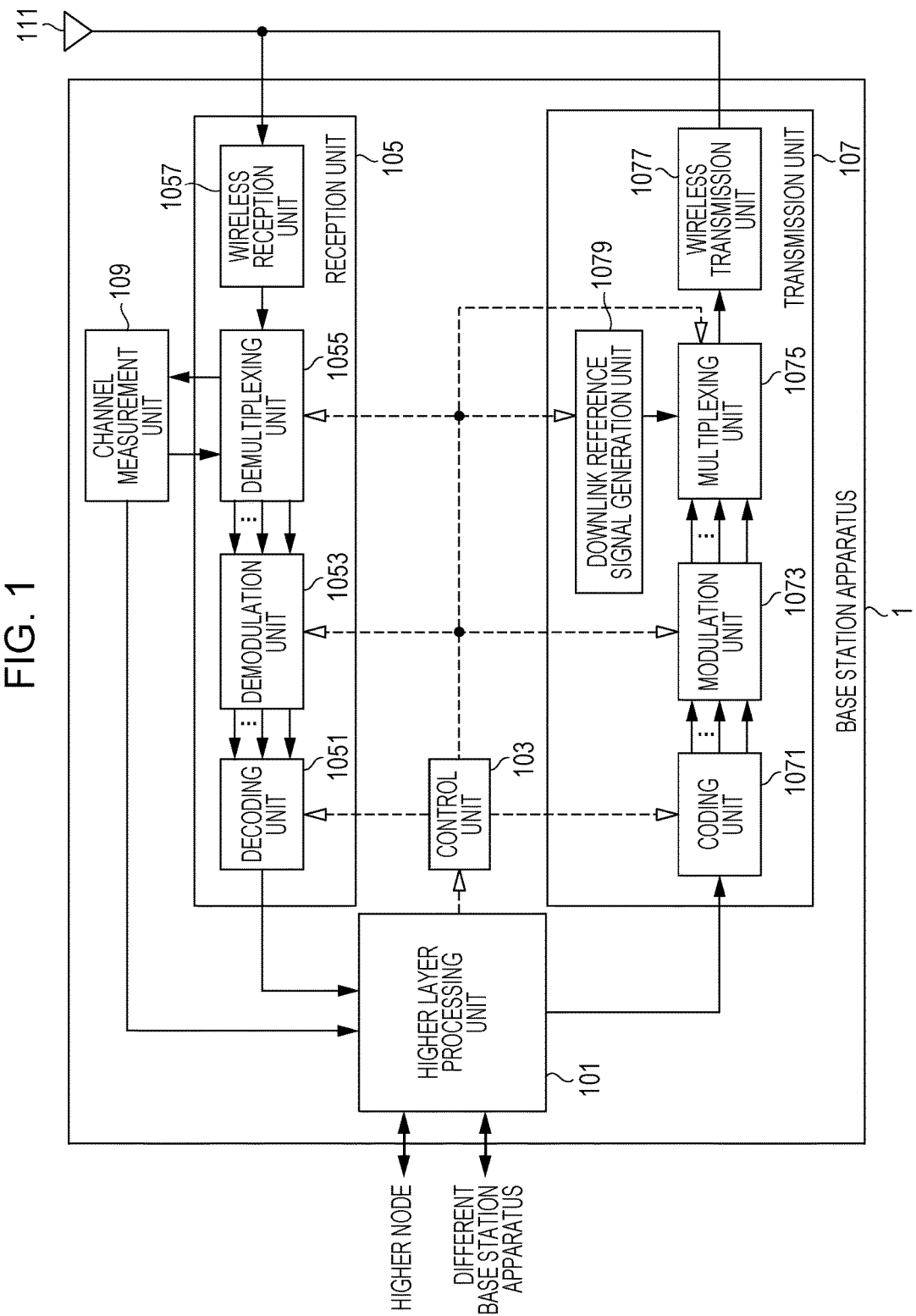
FIG. 1 is a schematic block diagram illustrating a configuration of a base station apparatus 1 according to a first embodiment of the present invention.

Carrier aggregation in which communication is performed by putting multiple component carriers together is applied to a communication system according to the present embodiment. Because a cell can be constituted from component carriers, in some cases, the carrier aggregation is referred to as a cell aggregation. To be more precise, the communication system according to the present embodiment can put multiple cells together and can perform communication. Furthermore, the communication system according to the present embodiment, the cell aggregation puts together a cell (TDD cell) to which a TDD scheme is applied and a cell (FDD cell) to which an FDD scheme is applied, among multiple cells, and performs the communication. That is, the cell aggregation in multiple cells for which different frame structure types are configured is applied to the communication system according to the present embodiment. Moreover, in some cases, a frame structure type is referred to as a duplex mode. In LTE or LTE-A, a frame structure type 1 is defined as FDD, and a frame structure type 2 is defined as TDD.

In the cell aggregation, one primary cell and one or more secondary cells are aggregated and the communication is performed. Furthermore, while the primary cell is constituted from an uplink component carrier and a downlink component carrier, the secondary cell is constituted from only downlink component carriers.

Multiple serving cells (multiple cells) that are set include one primary cell and one or multiple secondary cells. The primary cell is a cell that is indicated as a serving cell in which an initial connection establishment procedure is executed, a serving cell in which a connection re-establishment procedure starts, or a primary cell in a handover procedure. At a point in time at which an RRC connection is established, or later, the secondary cell may be set. Moreover, one base station apparatus 1 may be constituted from multiple serving cells.

Furthermore, an uplink and downlink frequency band (UL/DL operating band) and a duplex mode (TDD and FDD) are associated with one index. Furthermore, the uplink and downlink frequency band (operating band) and the duplex mode are managed with one table. In some cases, the index is referred to as an E-UTRA operating band or an E-UTRA band. For example, in some cases, an index 1 is referred to as a band 1, an index 2 as a band 2, and an index n as a band n. For example, with regard to the band 1, the duplex mode is FDD with an uplink operating band ranging from 1920 MHz to 1980 MHz and a downlink operating band ranging from 2110 MHz to 2170 MHz. Furthermore, with regard to the band 33, the duplex mode is TDD with the uplink and downlink operating band ranging from 1900 MHz to 1920 MHz.

Furthermore, a combination (E-UTRA CA Band) of bands in which the carrier aggregation is possible may be set. For example, an indication that the carrier aggregation that results from the component carriers within the band 1 and the band 5 is possible may be provided. That is, an indication of whether or not the carrier aggregation that results from the component carriers in different bands is possible may be provided.

A combination of the band that is supported by the terminal device 2 and the band in which the carrier aggregation is possible is configured for functional information of the terminal device 2 (UE capability or UE-EUTRA-Capability), and by the functional information being transmitted from the terminal device 2, the base station apparatus 1 can recognize a function that is retained by that terminal device 2.

The present invention may be applied to some of the multiple cells. In some cases, a cell that is configured for the terminal device 2 is also referred to as the serving cell.

TDD is a technology that enables downlink and uplink communication in a single frequency band (a carrier frequency or a component carrier) by performing time division multiplexing on an uplink signal and a downlink signal. In LTE, switching between the downlink and the uplink can be performed on a subframe basis by providing a configuration in advance. Moreover, in TDD, a subframe (special subframe) on which switching between downlink transmission and uplink transmission is possible in a time domain (a symbol region) is defined by providing a subframe (a downlink subframe or a subframe that is reserved for the downlink transmission) on which the downlink transmission is possible, a subframe (an uplink subframe or a subframe that is reserved for the uplink transmission) on which the uplink transmission is possible, and a guard period (GP). Moreover, in the special subframe, the time domain (a symbol that corresponds to the time domain) in which the downlink transmission is possible is referred to as a downlink pilot time slot (DwPTS), and the time domain (the symbol that corresponds to the time domain) in which the uplink transmission is possible is referred to as an uplink pilot time slot (UpPTS). For example, the terminal device 2 can receive the downlink signal that is transmitted by the base station apparatus 1, in a case where a subframe i is the downlink subframe, and can transmit the uplink signal from the terminal device 2 to the base station apparatus 1, in a case where a subframe j that is different from the subframe i is the uplink subframe. Furthermore, in a case where a subframe k that is different from the subframe i or the subframe j is the special subframe, the downlink signal can be received on a downlink time domain DwPTS and the uplink signal can be transmitted on an uplink time domain UpPTS.

Furthermore, in LTE and LTE-A, in order to perform the communication using the TDD scheme, a notification is provided using a specific information element (TDD uplink-downlink configuration(s) (TDD UL/DL configuration(s), TDD configuration(s) (tdd-Config or TDD config), or uplink-downlink configuration(s) (UL/DL (UL-DL) configuration(s))). Based on information that is notified, the terminal device 2 regards a certain subframe as any of the uplink subframe, the downlink subframe, and the special subframe, and can perform transmission and reception processing.

Furthermore, a configuration (lengths of the DwPTS, the UpPTS, and the GP within the special subframe) of the special subframe is defined by multiple patterns, and is managed using a table. The multiple patterns are associated with their respective values (indexes) and the value is notified, and thus the terminal device performs processing of the special subframe based on a pattern that is associated with the value that is notified. That is, the base station apparatus 1 can also notify the terminal device 2 of information relating to the configuration of the special subframe.

Furthermore, according to traffic (an amount of information, an amount of data, or an amount of communication) of the uplink and traffic (an amount of information, an amount of data, or an amount of communication) of the downlink, a traffic adaptive control technology that changes a ratio between an uplink resource and a downlink resource may be applied to TDD. For example, a ratio between the downlink subframe and the uplink subframe can be changed dynamically. The switching between the downlink subframe and the uplink subframe can adaptively be performed on a certain subframe. Such a subframe is referred to as a flexible subframe. In the flexible subframe, the base station apparatus 1 can perform reception of the uplink signal or transmission of the downlink signal on the flexible subframe according to a condition (situation). Furthermore, as long as the base station apparatus 1 does not instruct the terminal device 2 to transmit the uplink signal in the flexible subframe, the terminal device 2 regards the flexible subframe as the downlink subframe and can perform reception processing. Furthermore, in some cases, TDD in which the ratio between the downlink subframe and the uplink subframe, the subframes for the uplink and the downlink, or the TDD UL/DL (re-) configuration is changed dynamically is referred to as dynamic TDD (DTDD). For example, TDD UL/DL configuration information may be transmitted by L1 signaling.

On the other hand, FDD is a technology that enables the downlink and uplink communication in different frequency bands (carrier frequencies or component carriers).

For such a communication system, a cellular communication system may be applied in which an area is divided in a cellular pattern into multiple areas, each covered by the base station apparatus 1. Furthermore, a single base station apparatus 1 may manage multiple cells. Furthermore, a single base station apparatus 1 may manage multiple remote radio heads (RRHs). Furthermore, a single base station apparatus 1 may manage multiple local areas. Furthermore, a single base station apparatus 1 may manage heterogeneous networks (HetNets). Furthermore, a single base station apparatus 1 may manage multiple low power base station apparatuses (low power nodes (LPNs)).

In the communication system, the terminal device 2 measures a reference signal received power (RSRP) based on a cell-specific reference signal(s) (CRS(s)).

In the communication system, the communication may be performed using a carrier (a component carrier) that is defined in LTE and to which one portion of a physical channel or a signal is not allocated or mapped. At this point, such a carrier is referred to as a new carrier type (NCT). For example, a cell-specific reference signal, a physical downlink control channel, a synchronization signal (a primary synchronization signal or a secondary synchronization signal) may not be mapped to the new carrier type. Furthermore, it has been considered that a physical channel (a physical discovery channel (PDCH), a new discovery signal(s) (NDS(s)), or a discovery reference signal (DRS), or a discovery signal (DS)) for performing mobility measurement and time/frequency synchronization detection is introduced in a cell for which the new carrier type is configured. Moreover, in some cases, the new carrier type is also referred to as an additional carrier type (ACT). Furthermore, in some cases, in contrast to the NCT, an existing carrier type is also referred to as a legacy carrier type (LCT).

According to the present embodiment, "X/Y" includes the meaning of "X or Y". According to the present embodiment, "X/Y" includes the meaning of "X and Y". According to the present embodiment, "X/Y" includes the meaning of "X and/or Y".

(Physical Channel)

A main physical channel (or a physical signal) that is used in LTE and LTE-A is described. The channel means a medium that is used for signal transmission. The physical channel means a physical medium that is used for signal transmission. There is a likelihood that, in LTE and LTE-A, and in standard releases after LTE and LET-A, a physical channel will be added from now on or a structure or format type of the physical channel will be changed or added, but even in such a case, the addition or change do not have an effect on a description of each embodiment of the present invention.

In LTE and LTE-A, physical channel scheduling is managed using a radio frame. 1 radio frame is 10 ms, and 1 radio frame is constituted from 10 subframes. Moreover, 1 subframe is constituted from 2 slots (that is, 1 slot is 0.5 ms). Furthermore, management is performed using a resource block as a minimum unit of scheduling for allocating the physical channel. The resource block is defined by a fixed frequency region that is constituted from a set of multiple subcarriers (for example, 12 subcarriers) along a frequency axis and by a region that is constituted from fixed transmission time intervals (for example, 1 slot or 7 symbols).

In order to improve communication precision, a cyclic prefix (CP) that is equivalent is transmitted in a state of being granted to the physical channel. The number of symbols that are allocated within 1 slot changes with the length of the CP. For example, in the case of a normal CP, 7 symbols can be allocated within one slot and in the case of an extended CP, 6 symbols are allocated within 1 slot.

Furthermore, 24 subcarriers can be allocated within 1 resource block by narrowing a spacing between subcarriers. Application to a specific physical channel may be provided.

The physical channel corresponds to a set of resources on which information that is output from a higher layer is transferred. The physical signal is used in a physical layer, and does not carry the information that is output the higher layer. To be more precise, higher layer control information, such as a radio resource control (RRC) message or system information (SI), is transmitted on the physical channel.

As downlink physical channels, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). Furthermore, as downlink physical signals, there are various reference signals and various synchronization signals. As downlink reference signals (DL-RS), there are a cell-specific reference signal (CRS), a UE-specific reference (UERS), and a channel state information reference signal (CSI-RS). As synchronization signals, there are a primary synchronization signal (PSS), and a secondary synchronization signal (SSS).

As uplink physical channels, there are a physical uplink shared channel (PUSCH), a physical uplink control channel (PUCCH), and a physical random access channel (PRACH). Furthermore, as uplink physical signals, there are various reference signals. As uplink reference signals, there are a demodulation reference signal (DMRS) and a sounding reference signal (SRS).

Synchronization signals are 3 types of PSSs and an SSS that is constituted from 31 types of codes which are alternately arranged in the frequency domain, and 504 physical lay cell identifiers (physical layer cell identities (PCIs), physical cell identities, or physical cell identifiers) by which to identify the base station apparatus 1 and a frame timing for radio synchronization are indicated by combinations of the PSS and the SSS. The terminal device 2 specifies a cell identifier of the synchronization signal that is received through cell search. Moreover, in some cases, the cell identifier is also referred to as a cell ID. In some cases, the physical layer cell identifier is also referred to as a physical cell ID.

The physical broadcast channel (PBCH) is transmitted for the purpose of notifying a control parameter (broadcast information or system information) that is used in a manner that is common to terminal devices 2 within a cell. Furthermore, the broadcast information (for example, an SIB 1 or one portion of the system information) that is not notified on the PBCH is transmitted on the PDSCH through a DL-SCH. As pieces of broadcast information, a cell global identifier (CGI) indicating an identifier of an individual cell, a tracking area identifier (TAI) for managing a waiting area by paging, random access configuration information (a transmission timing timer or the like), common radio resource configuration information (shared radio resource configuration information), and the like are notified.

The downlink reference signals are categorized by their usage into multiple types. For example, the cell-specific reference signal (CRS) is the pilot signal that is transmitted with a prescribed power for each cell, and is the downlink reference signal that is periodically iterated in the frequency domain and the time domain based on a prescribed rule. The terminal device 2 measures reception quality for each cell by receiving the cell-specific reference signal. Furthermore, the terminal device 2 also uses the cell-specific reference signal as a reference signal for demodulation of the physical downlink control channel that is transmitted at the same antenna port as the cell-specific reference signal, or of the physical downlink shared channel. As a sequence that is used for the cell-specific reference signal, a sequence that is identifiable for each cell is used. The CRS may be transmitted by the base station apparatus 1 on all the downlink subframes, but the terminal device 2 may receive the CRS on only the designated downlink subframe.

Furthermore, the downlink reference signal is used for downlink channel change estimation. The downlink reference signal that is used for the channel change estimation may be referred to as the channel state information reference signal (CSI-RS) or the CSI reference signal. Furthermore, the CSI reference signal that is not actually signal-transmitted or that is transmitted with a zero power may be referred to as a zero power channel state information reference signal (ZP CSI-RS) or a zero-power CSI reference signal. Furthermore, the CSI reference signal that is not actually signal-transmitted may be referred as a non-zero power channel state information reference signal (NZP CSI-RS) or a non-zero power CSI reference signal.

Furthermore, a downlink resource that is used for measuring an interference component may be referred to as a channel state information interference measurement resource (CSI-IMR) or a CSI-IM resource. The terminal device 2 may perform measurement of the interference signal for calculating a value of CQI, using the zero-power CSI reference signal that is included in the CSI-IM resource. Furthermore, the downlink reference signal that is dedicatedly set for every terminal device 2 is referred to as a UE-specific reference signal (UERS), a dedicated reference signal, a downlink demodulation reference signal (DL DMRS), or the like, and is used for demodulation of a physical downlink control channel or a physical downlink shared channel.

Moreover, a sequence of these downlink reference signals may be generated based on a pseudo-random sequence. Furthermore, the sequence of the downlink reference signals may be generated based on a Zadoff-Chu sequence. Furthermore, the sequence of the downlink reference signals may be generated based on a gold sequence. Furthermore, the sequence of the downlink reference signals may be a subspecies of or a modification to the pseudo-random sequence, the Zadoff-Chu, or the gold sequence.

The physical downlink shared channel (PDSCH) is used for transmitting downlink data (DL-SCH). Furthermore, the PDSCH is also used in case where the system information is transmitted on the DL-SCH. Radio resource allocation information of the physical downlink shared channel is indicated with the physical downlink control channel. Furthermore, the PDSCH is also used for notifying a parameter (an information element or an RRC message) relating to the uplink and the downlink.

The physical downlink control channel (PDCCH) is transmitted on several OFDM symbols starting from the head of each subframe, and is used for the purpose of instructing the terminal device 2 on resource allocation information in accordance with scheduling by the base station apparatus 1, or on the amount of adjustment for an increase or a decrease in transmit power. The terminal device 2 monitors the physical downlink control channel that is destined for the terminal device 2 itself before transmitting and receiving a layer 3 message (paging, a handover command, an RRC message or the like), and needs to acquire the resource allocation information that is referred to as an uplink grant at the time of transmission and as a downlink grant (also referred to as a downlink assignment) at the time of reception, from the physical downlink control channel that is destined for the terminal device 2 itself. Moreover, in addition to being transmitted on the OFDM symbol described above, it is also possible that the physical downlink control channel is configured to be transmitted on a region of the resource block that is dedicatedly allocated from the base station apparatus 1 to the terminal device 2. In some cases, the physical downlink control channel that is transmitted on the region of the resource block which is dedicatedly allocated from the base station apparatus 1 to the terminal device 2 is also referred to as the enhanced physical downlink control channel (enhanced PDCCH (EPDCCH)). Furthermore, in some cases, the PDCCH that is transmitted on the OFDM symbols described above is also referred to as a first control channel. Furthermore, in some cases, the EPDCCH is also referred to as a second control channel. Furthermore, in some cases, a resource region to which the PDCCH is allocable is also referred to as a first control channel region and a resource region to which the EPDCCH is allocable is also referred to as a second control channel region. Moreover, the PDCCH that will be described below is assumed to basically include the EPDCCH.

The base station apparatus 1 may transmit the PCFICH, the PHICH, the PDCCH, the EPDCCH, the PDSCH, the synchronization signal (the PSS/SSS), and the downlink reference signal, on the DwPTS of the special subframe. Furthermore, the base station apparatus 1 may not transmit the PBCH on the DwPTS of the special subframe.

Furthermore, the terminal device 2 may transmit the PRACH and the SRS on the UpPTS of the special subframe. Furthermore, the terminal device 2 may not transmit the PUCCH, the PUSCH, and the DMRS on the UpPTS of the special subframe.

Furthermore, in a case where the special subframe is constituted from only the GP and the UpPTS, the terminal device 2 may transmit the PUCCH and/or the PUSCH and/or the DMRS on the UpPTS of the special subframe.

At this point, the terminal device 2 monitors a set of PDCCH candidates and/or a set of EPDCCH candidates. The PDCCH hereinafter includes the EPDCCH for the sake of brief description. The PDCCH candidate refers to a candidate for the PDCCH that has the likelihood of being mapped or transmitted by the base station apparatus 1. Furthermore, the PDCCH candidate is constituted from one or multiple control channel elements (CCEs). Furthermore, the monitoring may include attempts up to and including an attempt by the terminal device 2 to perform decoding on each of the PDCCHs within the set of PDCCH candidates, according to all DCI formats that are monitored.

At this point, the set of PDCCH candidates that the terminal device 2 monitors is also referred to as a search space. The search space is a set of resources that have a likelihood of being used by the base station apparatus 1 for transmission of the PDCCH. In a PDCCH region, a common search space (CSS) and a UE-specific search space (USS) are configured (defined or set).

The CSS is used for transmission of downlink control information to multiple terminal devices 2. That is, the CSS is defined by resources that are common to the multiple terminal devices 2. Furthermore, the USS is used for the transmission of the downlink control information to a certain specific terminal device 2. That is, the USS is dedicatedly set for a certain specific terminal device 2. Furthermore, the USS may be set for multiple terminal devices 2 in an overlapping manner.

The downlink control information (DCI) is transmitted in a specific format (configuration or type) from the base station apparatus 1 to the terminal device 2. The format may be referred to as the DCI format. Moreover, the transmission of the DCI format includes transmitting the DCI in a certain format. In other words, it can be said that the DCI format is a format for transmitting the DCI. Multiple formats are prepared for the DCI formats that are transmitted from the base station apparatus 1 to the terminal device 2 (for example, a DCI format 0/1/1A/1B/1C/1D/2/2A/2B/2C/2D/

3/3A/4). Fields (bit fields) that correspond to various pieces of downlink control information are set for the DCI formats.

In a case where common DCI (single DCI) is transmitted in a certain DCI format to multiple terminal devices 2, the base station apparatus 1 transmits the common DCI in a PDCCH (or EPDCCH) CSS, and, in a case where the DCI is transmitted dedicatedly in the DCI format to the terminal device 2, transmits the DCI in a PDCCH (or EPDCCH) USS.

As pieces of DCI that are transmitted in the DCI format, there are resource allocation to the PUSCH or the PDSCH, a modulation coding scheme, a sounding reference signal request (an SRS request), a channel state information request (a CSI request), indication of initial transmission or re-transmission of a single transport block, a transmit power control command for the PUSCH, a transmit power control command for the PUCCH, a cyclic shift of a UL DMRS and an index of an orthogonal code cover (OCC), and the like. In addition to these, various pieces of DCI are defined by specifications.

A format that is used for uplink transmission control (for example, PUSCH scheduling or the like) may be referred to as an uplink DCI format (for example, a DCI format 0/4) or the DCI relating to the uplink. A format that is used for downlink reception control (for example, PDSCH scheduling or the like) may be referred to as a downlink DCI format (for example, a DCI format 1/1A/1B/1C/1D/2/2A/2B/2C/2D) or the DCI relating to the downlink. A format that is used for adjusting a transmit power of each of the multiple terminal devices 2 may be referred to as a group triggering DCI format (for example, a DCI format 3/3A).

For example, the DCI format 0 is used for transmitting information relating to resource allocation to the PUSCH that is necessary for performing scheduling of one PUSCH in one serving cell, information relating to a modulation scheme, information relating to a transmit power control (TPC) command for the PUSCH, or the like. Furthermore, these pieces of DCI are transmitted on the PDCCH/EPDCCH. The DCI format is said to be constituted from at least one piece of DCI.

In the CSS and/or the USS of the PDCCH region, the terminal device 2 monitors the PDCCH and detects the PDCCH that is destined for the terminal device 2 itself.

Furthermore, an RNTI that the base station apparatus 1 allocates to the terminal device 2 is used for the transmission (transmission on the PDCCH) of the downlink control information. Specifically, a cyclic redundancy check (CRC) parity bit is attached to the DCI format (also possibly to the downlink control information). After being attached, the CRC parity bit is scrambled by the RNTI.

The terminal device 2 attempts to perform the decoding on the DCI format to which the CRC parity bit scrambled by the RNTI is attached, and detects the DCI format that succeeds in the CRC, as the DCI format that is destined for the terminal device 2 itself (which is also called blind decoding). That is, the terminal device 2 attempts to perform the decoding on the PDCCH that is accompanied by the CRC that is scrambled by the RNTI, and detects the PDCCH that succeeds in the CRC, as the PDCCH that is destined for the terminal device 2 itself.

At this point, a cell-radio network temporary identifier (C-RNTI) is included in the RNTI. The C-RNTI is a unique identifier that is used for RRC connection and scheduling identification. The C-RNTI is used for unicast transmission that is dynamically scheduled.

Furthermore, a temporary C-RNTI is included in the RNTI. The temporary C-RNTI is an identifier that is used for a random access procedure. For example, the terminal device 2 may attempt to decode the DCI format (for example, the DCI format 0) associated with the uplink to which the CRC scrambled by the temporary C-RNTI is attached, in only the CSS. Furthermore, the terminal device 2 may attempt to decode the DCI format (for example, the DCI format 1A) associated with the downlink to which the CRC scrambled by the temporary C-RNTI is attached, in the CSS and the USS.

Furthermore, in a case where the DCI is transmitted in the CSS, the base station apparatus 1 may attach the CRC parity bit scrambled with the temporary C-RNTI or the C-RNTI to the DCI (DCI format). In a case where the DCI is transmitted in the USS, the base station apparatus 1 may attach the CRC scrambled with the C-RNTI to the DCI (DCI format).

The physical uplink shared channel (PUSCH) is used mainly to transmit uplink data and uplink control information (UCI). The UCI that is transmitted on the PUSCH includes channel state information (CSI) and/or an ACK/NACK. Furthermore, the CSI that is transmitted on the PUSCH includes aperiodic CSI (A-CSI) and periodic CSI (P-CSI). Furthermore, as is the case with the downlink, the information on resource allocation to the physical uplink shared channel is indicated with the physical downlink control channel. Furthermore, the uplink data is transferred on the PUSCH that is scrambled by a dynamic scheduling grant. Furthermore, information (for example, identification information of the terminal device 2, or message 3) of the terminal device 2 itself, which is associated with random access, is transmitted on the PUSCH that is scrambled by a random access response grant. Furthermore, parameters that are used for setting a transmit power for transmission on the PUSCH may differ according to a type of detected grant. Moreover, control data is transmitted in the form of channel quality information (CQI and/or PMI), an HARQ-ACK, or an RI. To be more precise, the control data is transmitted in the form of uplink control information.

The physical uplink control channel (PUCCH) is used for sending an acknowledgment/negative acknowledgment (ACK/NACK) of downlink data that is transmitted on the physical downlink shared channel, for notifying downlink channel information (channel state information) and for making a scheduling request (SR) that is an uplink resource allocation request (radio resource request). The channel state information (CSI) includes a channel quality indicator (CQI), a precoding matrix indicator (PMI), a precoding type indicator (PTI), and a rank indicator (RI). In some cases, each indicator is expressed as an indication, but the indicator and the indication have the same application and meaning. Furthermore, a format of the PUCCH may be switched according to the UCI that is transmitted. For example, in a case where the UCI is constituted from the HARQ-ACK and/or the SR, the UCI may be transmitted on the PUCCH (PUCCH format 1/1a/1b/3) in the format 1/1a/1b/3. Furthermore, in a case where the UCI is constituted from the CSIs, the UCI may be transmitted on the PUCCH (PUCCH format 2/2a/2b) in the format 2/2a/2b. Furthermore, as a PUCCH format 1/1a/1b, there is a shortened format that is punctured for 1 symbol in order to avoid collision with the SRS and a normal format that is not punctured. For example, in a case where the concurrent transmission of the PUCCH and the SRS on the same subframe is effective, the PUCCH format 1/1a/1b is transmitted in the shortened format on an SRS subframe. For example, in a case where the concurrent transmission of the PUCCH and the SRS on the same subframe is not effective, the PUCCH format 1/1a/1b is transmitted in the normal format on the SRS subframe. At the time, although SRS transmission takes place, the SRS may not be transmitted.

As types of CSI reports, there are a periodic CSI report through which the channel state information is reported periodically or in a case where an event condition for triggering the CSI report is satisfied, and an aperiodic CSI report through which the channel state information is reported in a case where the CSI report is requested with the CSI request that is included in the DCI format. The periodic CSI report is performed on the PUCCH or the PUSCH, and the aperiodic CSI report is performed on the PUSCH. The terminal device 2, when requested based on information (the CSI request) included in the DCI format, can transmit the CSI that is not accompanied by the uplink data, on the PUSCH.

The uplink reference signal (UL-RS) includes the demodulation reference signal (DMRS) that is used by the base station apparatus 1 for demodulating the physical uplink control channel (PUCCH) and/or the physical uplink shared channel (PUSCH), and the sounding reference signal (SRS) that is used by the base station apparatus 1 mainly for estimating an uplink channel state. Furthermore, as the sounding reference signals, there are a periodic sounding reference signal (periodic SRS (P-SRS)) that is configured to be transmitted periodically by the higher layer, and an aperiodic sounding reference signal (aperiodic SRS (A-SRS)) of which transmission is requested with the SRS request that is included in a downlink control information format. In some cases, the uplink reference signal is also referred to as an uplink pilot signal or an uplink pilot channel.

Moreover, a sequence of these uplink reference signals may be generated based on the pseudo-random sequence. Furthermore, the sequence of the uplink reference signals may be generated based on the Zadoff-Chu sequence. Furthermore, the sequence of the uplink reference signals may be generated based on the gold sequence. Furthermore, the sequence of the uplink reference signals may be the subspecies of or the modification to the pseudo-random sequence, the Zadoff-Chu sequence, or the gold sequence.

Furthermore, in some cases, the periodic sounding reference signal is also referred to as a periodic sounding reference signal or a trigger type 0 sounding reference signal (trigger type 0 SRS). Furthermore, in some cases, the aperiodic sounding reference signal is also referred to as an aperiodic sounding reference signal or a trigger type 1 sounding reference signal (trigger type 1 SRS).

Moreover, the A-SRS may be divided into a signal (for example, which, in some cases, is referred to as a trigger type 1a SRS) that is a specialized signal for uplink channel estimation, in coordinated communication, and a signal (for example, which, in some cases, is referred to as a trigger type 1b SRS) that is used for causing the base station apparatus 1 to measure the channel state (the CSI, the CQI, the PMI, or the RI) using channel reciprocity, in TDD. Moreover, the DMRS is configured to correspond to each of the PUSCH and the PUCCH. Furthermore, the DMRS is time-multiplexed onto the same subframe as with the PUSCH or the PUCCH and is transmitted.

Furthermore, in the case of the PUSCH and in the case of the PUCCH, the DMRS may differ in terms of a time multiplexing method. For example, while the DMRS for the PUSCH is mapped within 1 slot that is constituted from 7 symbols, using only 1 symbol, the DMRS for the PUCCH is mapped within 1 slot that is constituted from 7 symbols, using 3 symbols.

Furthermore, for the SRS, various parameters (a bandwidth, a cyclic shift, a transmission subframe, and the like) are notified with higher layer signaling. Furthermore, for the SRS, a subframe on which the SRS is transmitted is determined based on information relating to the transmission subframe that is an SRS configuration which is notified by the higher layer signaling. As pieces of information relating to the transmission subframe, there are information (common information) that is configured to be cell-specific, and information (dedicated information or individual information) that is configured to be UE-specific. The information that is configured to be cell-specific includes information indicating a subframe on which the SRS that is shared among all terminal devices 2 within a cell is transmitted. Furthermore, the information that is configured to be UE-specific includes information indicating a subframe offset that is a subset of subframe that is configured to be cell-specific, and periodicity. With these pieces of information, the terminal device 2 can determine a subframe (which, in some cases, is referred to as an SRS subframe or an SRS transmission subframe) on which the SRS can be transmitted. Furthermore, in a case where the PUSCH is transmitted in the subframe on which the SRS that is configured to be cell-specific is transmitted, the terminal device 2 can puncture as many time resources for the PUSCH as symbols on which the SRS is transmitted, and can transmit the PUSCH on the time sources. By doing this, a collision can be avoided between the transmission of the PUSCH and the transmission of the SRS between the terminal devices 2. Performance degradation can be prevented with respect to the terminal device 2 that transmits the PUSCH. Furthermore, channel estimation precision can be secured for the terminal device 2 that transmits the SRS. At this point, the information that is configured to be UE-specific may be constituted independently with the P-SRS or the A-SRS.

For example, in a case where various parameters are configured with the higher layer signaling, a first uplink reference signal is periodically transmitted based on the transmission subframe that is configured. Furthermore, in a case where a transmission request is made, a second uplink reference signal is aperiodically transmitted with a field (the SRS request) relating to a request for transmission of the second uplink reference signal, which is included in the downlink control information format. In a case where the SRS request that is included in a certain downlink control information format indicates a positive or positive-equivalent index (value), the terminal device 2 transmits the A-SRS on a prescribed transmission subframe. Furthermore, in a case where the detected SRS request indicates the negative or negative-equivalent index (value), the terminal device 2 does not transmit the A-SRS on a prescribed subframe. Moreover, the information (shared parameter or shared information) that is configured to be cell-specific is notified using the system information or a dedicated control channel (DCCH). Furthermore, the information (a dedicated parameter, an individual parameter, the dedicated information, or the individual information) that is configured to be UE-specific is notified using a common control channel (CCCH). These pieces of information may be notified with the RRC message. The RRC message may be notified by the higher layer.

The physical random access channel (PRACH) is a channel that is used for notifying a preamble sequence and has a guard time. The preamble sequence is configured in such a manner that 64 types of sequences are prepared to express G-bit information. The physical random access channel is used as means by which the terminal device 2 has access to the base station apparatus 1. The terminal device 2 uses the physical random access channel in order to make a request to the base station apparatus 1 for the radio resource when the physical uplink control channel is not set, in response to the scheduling request (SR), or to make a request to the base station apparatus 1 for transmission timing adjustment information (also referred to as timing advance (TA)) necessary to adjust uplink transmission timing to a reception timing window of the base station apparatus.

Specifically, the terminal device 2 transmits the preamble sequence using the radio resource for the physical random access channel that is configured by the base station apparatus 1. The terminal device 2 that receives the transmission timing adjustment information configures the transmission timing timer that counts the effective time of the transmission timing adjustment information that is configured to be in common use by the broadcast information (or is dedicatedly set with the layer 3 message), and manages an uplink state as a transmission timing adjustment state during the effective time of the transmission timing timer (while the counting is in progress) and as a transmission timing non-adjustment state (a state where the transmission timing is not adjusted) during the non-effective time (after the transmission timing timer expires). The layer 3 message is a control-plane (C-plane) message that is exchanged in a radio resource control (RRC) layer between the terminal device 2 and the base station apparatus 1, and is used as a message that has the same meaning as RRC signaling or the RRC message. Furthermore, in some cases, the RRC signaling is also referred to as the higher layer signaling or dedicated signaling.

The random access procedures include two random access procedures. One is a contention-based random access procedure and the other is a non-contention-based random access procedure. The contention-based random access procedure is a random access procedure in which there is a likelihood that a collision will occur between multiple terminal devices 2.

Furthermore, the non-contention-based random access procedure is a random access procedure in which a collision does not occur between the multiple terminal devices 2.

The non-contention-based random access procedure is made up of 3 steps, and the base station apparatus 1 notifies the terminal device 2 of a random access preamble assignment with the dedicated signaling for the downlink. At this time, for the random access preamble assignment, the base station apparatus 1 allocates a random access preamble for non-contention to the terminal device 2, and the random access preamble assignment is transmitted by a source base station apparatus (source eNB) for handover, and is signaled by the handover command that is generated by a target base station apparatus (target eNB) or, in the case of a downlink data arrival, is signaled by the PDCCH.

The terminal device 2 that receives the random access preamble assignment transmits the random access preamble (message 1) on the RACH for the uplink. At this time, the terminal device 2 transmits the random access preamble for non-contention that is allocated.

The base station apparatus 1 that receives the random access preamble transmits the random access response to the terminal device 2 on the downlink data (downlink shared channel (DL-SCH)). Furthermore, information that is transmitted with the random access response includes an initial uplink grant (a random access response grant) for and timing alignment information for handover, timing alignment information for downlink data arrival, and a random access preamble identifier. In some cases, the downlink data is also referred to as downlink shared channel data (DL-SCH data).

At this point, the non-contention-based random access procedure is applied to the handover, the downlink data arrival, and positioning. The contention-based random access procedure is applied to initial access from RRC IDLE, RRC connection re-establishment, the handover, the downlink data arrival, and an uplink data arrival.

The random access procedure according to the present embodiment is the contention-based random access procedure. An example of the contention-based random access procedure is described.

The terminal device 2 acquires system information block type 2 (SIB 2) that is transmitted by the base station apparatus 1. SIB 2 is a configuration (common information) that is common to all terminal devices 2 (or multiple terminal devices 2) within a cell. For example, the common configuration includes a configuration of the PRACH.

The terminal device 2 randomly selects a number of the random access preamble. Furthermore, the terminal device 2 transmits the random access preamble (message 1) of which a number is selected, to the base station apparatus 1 using the PRACH. The base station apparatus 1 estimates uplink transmission timing using the random access preamble.

The base station apparatus 1 transmits the random access response (message 2) using the PDSCH. The random access response includes multiple pieces of information for the random access preamble that is detected by the base station apparatus 1. For example, the pieces of information include a number of the random access preamble, the temporary C-RNTI, a timing advance command (TA command), and the random access response grant.

The terminal device 2 transmits (initially transmits) the uplink data (message 3) on the PUSCH that is scheduled using the random access response grant. The uplink data includes an identifier (information indicating InitialUE-Identity or the C-RNTI) for identifying the terminal device 2.

In a case where the base station apparatus 1 fails to decode the uplink data, the base station apparatus 1 gives an instruction for re-transmission of the uplink data using the DCI format to which the CRC parity bit scrambled by the temporary C-RNTI is attached. The terminal device 2, when instructed with the DCI format to re-transmit the uplink data, re-transmits the same uplink data on the PUSCH that is scheduled using the DCI format to which the CRC parity bit scrambled by the temporary C-RNTI is attached.

Furthermore, in the case where the base station apparatus 1 fails to decode the uplink data, the base station apparatus 1 can give an instruction to re-transmit the uplink data using the PHICH (NACK). The terminal device 2, when instructed with the NACK to re-transmit the uplink data, re-transmits the same uplink data on the PUSCH.

In a case where the base station apparatus 1 succeeds in decoding the uplink data, the base station apparatus 1 can recognize which of the terminal devices 2 performs transmission of the random access preamble and the uplink data, by acquiring the uplink data. That is, before succeeding in decoding the uplink data, the base station apparatus 1 cannot recognize which of the terminal devices 2 performs the transmission of the random access preamble and the uplink data.

In a case where the message 3 including InitialUE-Identity is received, the base station apparatus 1 transmits a contention resolution identity (message 4) that is generated based on InitialUE-Identity that is received, to the terminal device 2, using the PDSCH. In a case where the received contention resolution identifier and the received InitialUE-Identity are matched to each other, the terminal device 2 (1) regards the random access preamble as succeeding in contention resolution, (2) sets a value of the temporary C-RNTI to the C-RNTI, (3) discards the temporary C-RNTI, and (4) regards the random access procedure as being correctly completed.

Furthermore, in a case where the message 3 is received that includes information indicating the C-RNTI, the base station apparatus 1 transmits to the terminal device 2 the DCI format (message 4) to which the CRC parity bit scrambled by the received C-RNTI is attached. In a case where the DCI format to which the CRC parity bit scrambled by the C-RNTI is attached is decoded, the terminal device 2 (1) regards the random access preamble as succeeding in contention resolution, (2) discards the temporary C-RNTI, and (3) regards the random access procedure as being correctly completed.

That is, the base station apparatus 1 schedules the PUSCH, using the random access response grant, as part of the contention-based random access procedure.

The terminal device 2 transmits the uplink data (message 3) on the PUSCH that is scheduled using the random access response grant. That is, the terminal device 2 performs transmission on the PUSCH that corresponds to the random access response grant, as part of the contention-based random access procedure.

Furthermore, the base station apparatus 1 schedules the PUSCH, using the DCI format to which the CRC scrambled by the temporary C-RNTI is attached, as part of the contention-based random access procedure. Furthermore, the base station apparatus 1 schedules the transmission on the PUSCH or gives an instruction for the transmission of the PUSCH using the PHICH (NACK), as part of the contention-based random access procedure.

The terminal device 2 transmits (re-transmits) the uplink data (message 3) on the PUSCH that is scheduled using the DCI format to which the CRC scrambled by the temporary C-RNTI is attached. Furthermore, the terminal device 2 transmits (re-transmits) the uplink data (message 3) on the PUSCH that is scheduled, according to reception of the PHICH. That is, the terminal device 2 performs the transmission on the PUSCH that corresponds to re-transmission of the same uplink data (the transport block), as part of the contention-based random access procedure.

A logical channel will be described below. The logical channel is used for transferring the RRC message or the information element. Furthermore, the logical channel is transmitted on the physical channel through a transport channel.

A broadcast control channel (BCCH) is a logical channel that is used for broadcasting system control information. For example, the system information or information that is necessary for initial access is transmitted using this channel. A master information block (MIB) or system information block type 1 (SIB 1) is transferred using this logical channel.

The common control channel (CCCH) is a logical channel that is used for transmitting control information between the terminal device that does not have the RRC connection to a network and the network. For example, UE-specific control information or configuration information is transmitted using this logical channel.

The dedicated control channel (DCCH) is a logical channel that is used for bi-directionally transmitting dedicated control information (individual control information) between the terminal device 2 that has the RRC connection and the network. For example, cell-specific re-configuration information is transmitted using this logical channel.

In some cases, signaling that uses the CCCH or the DCCH is collectively also referred to as the RRC signaling.

As pieces of uplink power control, there are information that is notified as the broadcast information, information that is notified as information (common information) which is shared among the terminal devices 2 within the same cell, and information that is notified as UE-specific dedicated information. The terminal device 2 sets the transmit power based on only information that is notified as the broadcast information, or based on information that is notified as the broadcast information/shared information, and on information that is notified as the dedicated information.

Radio resource control configuration common information may be notified as the broadcast information (or the system information). Furthermore, the radio resource control configuration common information may be notified as the dedicated information (mobility control information).

Radio resource configurations include a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration relating to the uplink power control, a configuration relating to uplink cyclic prefix length, and the like. To be more precise, the radio resource configuration is a configuration for notifying a parameter that is used for generating the physical channel/physical signal. In a case where parameters (information elements) are notified as pieces of broadcast information, and in a case where the parameters (the information elements) are notified as pieces of re-configuration information, the parameters (information elements) that are notified may be different from each other.

Each of the information elements, necessary for configuring parameters relating to various physical channels/physical signals (the PRACH, PUCCH, the PUSCH, the SRS, the UL DMRS, the CRS, the CSI-RS, the PDCCH, the PDSCH, the PSS/SSS, the UERS, the PBCH, the PMCH, and the like), is constituted from shared configuration information that is shared among the terminal devices 2 within the same cell and dedicated configuration information that is configured for every terminal device 2. The common configuration information may be transmitted with the system information. Furthermore, the common configuration information may be transmitted as the dedicated information in a case where re-configuration is performed. These configurations include a configuration of a parameter. The configurations of the parameters include a configuration of a parameter value. Furthermore, in a case where parameters are managed using a table, configurations of the parameters include a configuration of an index value.

Information relating to a parameter for the physical channel described above is transmitted to the terminal device 2 using the RRC message. To be more precise, based on the received RRC message, the terminal device 2 configures the resource allocation or the transmit power for each physical channel. As the RRC messages, there are a message relating to a broadcast channel, a message relating to a multi-casting channel, a message relating to a paging channel, a message relating to each channel for the downlink, a message relating to each channel for the uplink, and the like. Each RRC message may be configured to include the information elements (IEs). Furthermore, the information element may include information that is equivalent to a parameter. Moreover, in some cases, the RRC message is also referred to as a message. Furthermore, a message class is a set of one or more messages. The message may include the information element. As the information elements, there are an information element relating to the radio resource control, an information element relating to security control, an information element relating to mobility control, an information element relating to measurement, an information element relating to a Multimedia Broadcast Multicast Service (MBMS), and the like. Furthermore, the information element may include a lower-level information element. The information element may be set as a parameter. Furthermore, the information element may be defined as control information indicating one or more parameters.

The information element (IE) is used for stipulating (designating or configuring) a parameter for various channels/signals/pieces of information with the system information (SI) or the dedicated signaling. Furthermore, a certain information element includes one or more fields. The information element may be constituted from one or more information elements. Moreover, in some cases, the field that is included in the information element is also referred to as a parameter. To be more precise, the information element may include one or more types of parameters (one or more parameters). Furthermore, the terminal device 2 performs radio resource allocation control, uplink power control, transmit control, and the like based on various parameters. Furthermore, the system information may be defined as the information element.

The information element may be configured to be in the field that constitutes the information element. Furthermore, a parameter may be configured to be in the field that constitutes the information element.

The RRC message includes one or more information elements. Furthermore, the RRC message for which multiple RRC messages are set is referred to as the message class.

As parameters relating to uplink transmit power control that is notified to the terminal device 2 using the system information, there are a normal power for the PUSCH, a normal power for the PUCCH, a channel loss compensation coefficient α, a list of power offsets that are configured for every PUCCH format, and a power offset for the preamble and the message 3. Additionally, as parameters relating to the random access channel, which is notified to the terminal device 2 using the system information, there are a parameter relating to the preamble, a parameter relating to the transmit power control for the random access channel, and a parameter relating to the transmit control for the random access preamble. These parameters are used at the time of the initial access, or when a re-connection/re-establishment is made after a radio link failure (RLF) occurs.

Information that is used for configuring the transmit power may be notified as the broadcast information to the terminal device 2. Furthermore, the information that is used for configuring the transmit power may be as the shared information to the terminal device 2. Furthermore, the information that is used for configuring the transmit power may be notified as the dedicated information (the individual information) to the terminal device 2.

(First Embodiment)

A first embodiment of the present invention will be described below. A communication system according to the first embodiment includes a primary base station apparatus (also referred to as a macro base station apparatus, a first base station apparatus, a first communication apparatus, a serving base station apparatus, an anchor base station apparatus, a master base station apparatus, a first access point, a first point, a first transmission point, a first reception point, a macro cell, a first cell, a primary cell, a master cell, and a master small cell) as a base station. apparatus 1 (hereinafter also referred to as an access point, a point, a transmission point, a reception point, a cell, a serving cell, a transmission apparatus, a reception apparatus, a transmission station, a reception station, a transmit antenna group, a transmit antenna port group, a receive antenna group, a receive antenna port group, a communication apparatus, a communication terminal, and an eNodeB). Moreover, the primary cell and the master cell (the master small cell) may be constituted independently. Moreover, the communication system according to the first embodiment may include a secondary base station apparatus (also referred to as a remote radio head (RRH)), a remote antenna, a forward-extending antenna, a distributed antenna, a second access point, a second point, a second transmission point, a second reception point, a reference point, a low power base station apparatus (a low power node (LPN)), a macro base station apparatus, a pico base station apparatus, a femto base station apparatus, a small base station apparatus, a local area base station apparatus, a phantom base station apparatus, a home (indoor) base station apparatus (a home eNodeB, a home NodeB, a HeNB, or a HNB), a second base station apparatus, a second communication apparatus, a coordinated base station apparatus group, a coordinated base station apparatus set, a coordinated base station apparatus, a micro cell, a pico cell, a femto cell, a small cell, a phantom cell, a local area, a second cell, and a secondary cell). Furthermore, the communication system according to the first embodiment includes a terminal device 2 (hereinafter also referred to as a mobile station, a mobile station apparatus, a mobile terminal, a reception device, a transmission device, a reception terminal, a transmission terminal, a third communication device, a receive antenna group, a receive antenna port group, a transmit antenna group, a transmit antenna port group, a user device, and user equipment (UE)). Here, the secondary base station apparatus may be described as multiple secondary base station apparatuses. For example, the primary base station apparatus and the secondary base station apparatus may perform communication with the terminal device using a heterogeneous network arrangement, with some or all portions of a coverage of the secondary base station apparatus being included in a coverage of the primary base station apparatus.

Furthermore, the communication system according to the first embodiment is constituted from the base station apparatus 1 and the terminal device 2. A single base station apparatus 1 may manage one or more terminal devices 2. Furthermore, a single base station apparatus 1 may manage one or more cells (the serving cell, the primary cell, the secondary cell, the femto cell, the pico cell, the small cell, and the phantom cell). Furthermore, a single base station apparatus 1 may manage one or more frequency bands (a component carrier and a carrier frequency). Furthermore, a single base station apparatus 1 may manage one or more low power base station apparatuses (low power nodes (LPNs)). Furthermore, a single base station apparatus 1 may manage one or more home (indoor) base station apparatuses (home eNodeBs (HeNBs)). Furthermore, a single base station apparatus 1 may one or more access points. The base station apparatuses 1 may be connected to one another in a wired manner (with an optical fiber, a copper wire, or a coaxial cable), or in a wireless manner (with an X2 interface, an X3 interface, or a Xn interface). To be more precise, between multiple base station apparatuses 1, communication may be performed at high speed (without any delay) with the optical fiber (ideal backhaul) and communication may be performed at low speed with the X2 interface (non-ideal backhaul). At this time, various pieces of information (the configuration information, the channel state information (CSI), functional information (UE capability) of the terminal device 2, information for handover, and the like) of the terminal device 2 may be communicated. Furthermore, the multiple base station apparatuses 1 may be managed with a network. Furthermore, a single base station apparatus 1 may one or more relay station apparatuses (relays).

Furthermore, the communication system according to the first embodiment may realize the coordinated communication (coordination multiple points (CoMP)) with multiple base station apparatuses, low power base station apparatuses, or home base station apparatuses. To be more precise, the communication system according to a basic aspect of the first embodiment may perform dynamic point selection (DPS) that dynamically switches among points (transmission points and/or reception points) through which communication with the terminal device 2 is performed. Furthermore, the communication system according to the first embodiment may perform coordinated scheduling (CS) or coordinated beamforming (CB). Furthermore, the communication system according to the basic mode of the first embodiment may perform joint transmission (JT) or joint reception (JR).

Furthermore, multiple low power base station apparatuses or multiple small cells, which are arranged close to one another, may be clustered (clustering or grouping). The multiple low power base station apparatuses that are clustered may notify the same configuration information. Furthermore, in some cases, areas (coverage) of the small cells that are clustered are referred to a local area.

In the downlink transmission, in some cases, the base station apparatus 1 is also referred to as a transmission point (TP). Furthermore, in some cases, in the uplink transmission, the base station apparatus 1 is also referred to as a reception point (RP). Furthermore, a downlink transmission point and an uplink reception point are path loss reference points (reference points) for measurement of downlink path loss. Furthermore, the reference point for the measurement of the pass loss may be configured independently of the transmission point or the reception point.

Furthermore, the small cell, the phantom cell, or the local area cell may be configured as a third cell. Furthermore, the small cell, the phantom cell, or the local area cell may be re-configured as the primary cell. Furthermore, the small cell, the phantom cell, or the local area cell may be re-configured as the secondary cell. The small cell, the phantom cell, or the local area cell may be re-configured as the serving cell. Furthermore, the small cell, the phantom cell, or the local area cell may be included in the serving cell.

The base station apparatus 1 that is able to constitute the small cell may perform discrete reception (DRX) or discrete transmission (DTX) whenever necessary. Furthermore, the base station apparatus 1 that is able to constitute the small cell may intermittently or semi-statically perform powering-on/off of some devices (for example, a transmission unit or a reception unit).

In some cases, an independent identifier (identity (ID)) is configured for the base station apparatus 1 that constitutes the macro cell and the base station apparatus 1 that constitutes the small cell. To be more precise, in some cases, the identifiers of the macro cell and the small cell are configured independently. For example, in a case where the cell-specific reference signals (CRSs) are transmitted from the macro cell and the small cell, respectively, in some cases, the cell-specific reference signals, although are the same in transmission frequency and radio resources, are scrambled with different identifiers. The cell-specific reference signal to the macro cell may be scrambled with a physical layer cell ID (physical layer cell identity (PCI)), and the cell-specific reference signal to the small cell may be scrambled with a virtual cell ID (virtual cell identity (VCI)). The scrambling may be performed with the physical layer cell ID (physical layer cell identity (PCI)) in the macro cell, and may be performed with a global cell ID (global cell identity (GCI)) in the small cell. The scrambling may be performed with a first physical layer cell ID in the macro cell, and maybe performed with a second physical layer cell ID in the small cell. The scrambling may be performed with a first virtual cell ID in the macro cell, and may be performed with a second virtual cell ID in the small cell. At this point, the virtual cell ID may be an ID that is configured for the physical channel/physical signal. Furthermore, the virtual cell ID may be an ID that is configured independently of the physical layer cell ID. Furthermore, the virtual cell ID may be an ID that is used for scrambling a sequence which is used for the physical channel/physical signal.

Furthermore, one portion of the physical channel or of the physical signal may not be transmitted in the small cell, the serving cell that is configured as the small cell, or the component carrier that corresponds to the small cell. For example, the cell-specific reference signal(s) (CRS(s)) or the physical downlink control channel (PDCCH) may not be transmitted. Furthermore, a new physical channel/physical signal may be transmitted in the small cell, the serving cell that is configured as the small cell, or the component carrier that corresponds to the small cell.

According to the first embodiment, in a case where different frame structure types (FDD (type 1) and TDD (type 2)) are applied in the primary cell and at least one secondary cell, if the terminal device 2 does not retain a function (performance or capability) of performing transmission and reception at the same time between bands in which each of the primary cell and the secondary cell is supported, the terminal device 2 that performs the cell aggregation (the carrier aggregation) does not transmit the transmission and reception at the same time in the primary cell and the secondary cell.

Figure 4:
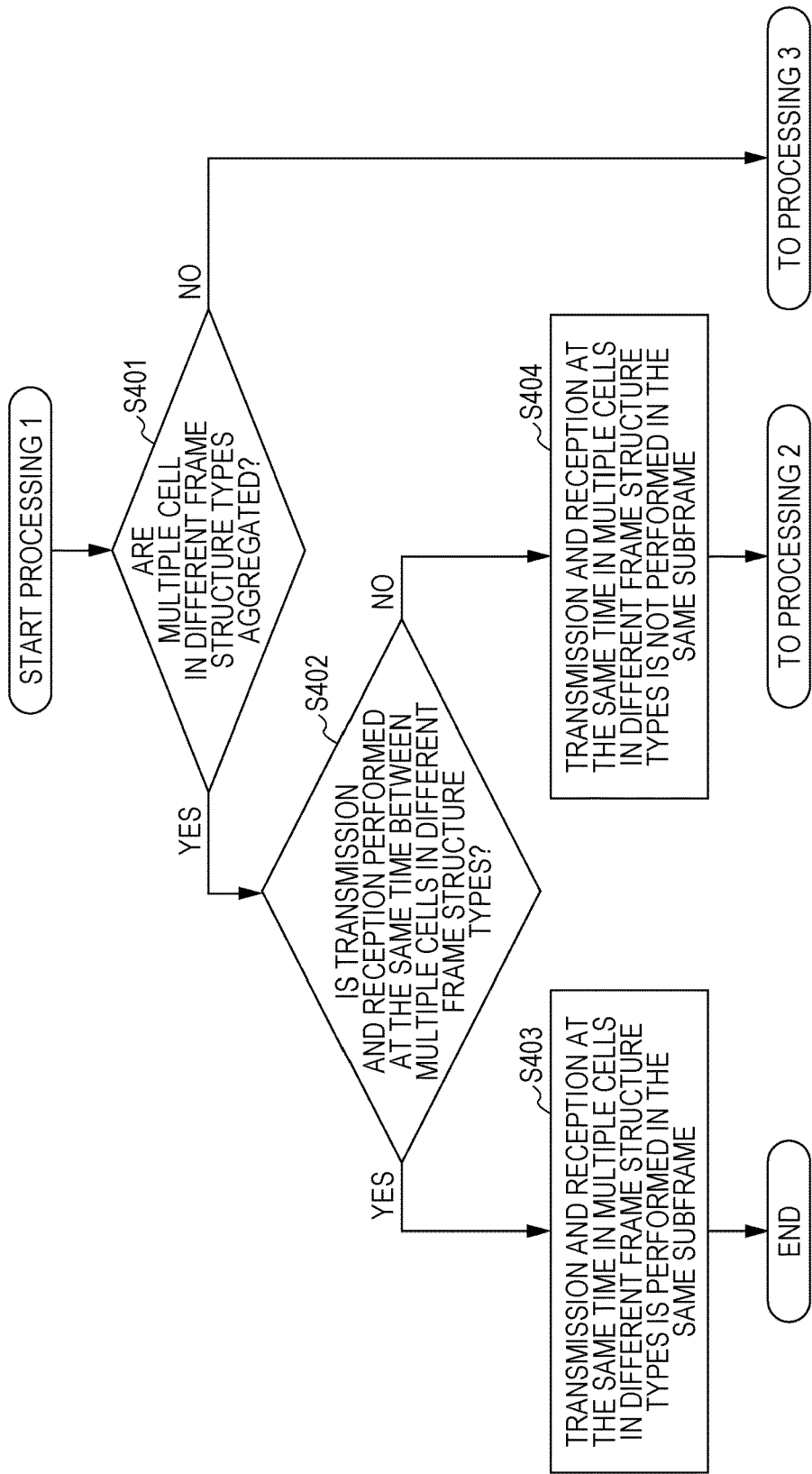
FIG. 4 is a flowchart illustrating a procedure for processing 1 by the terminal device 2 according to the first embodiment of the present invention.

FIG. 4 is a flowchart illustrating processing 1 by the terminal device 2 according to the first embodiment. In a case where the secondary aggregation in multiple cells, the terminal device 2 determine whether or not the multiple cells in a case where multiple cells in different frame structure types are aggregated (Step S401). In a case where the multiple cells in the different frame structure types are aggregated (YES in S401), it is determined whether or not the terminal device 2 retains the function of performing the transmission and reception at the same time in the multiple cells in a case where the different frame structure types (Step S402). In a case where the terminal device 2 retains the function of performing the transmission and reception at the same in the multiple cells in the different frame structure types (YES in S402), the terminal device 2 can perform the transmission and reception at the same time in the multiple cells in the different frame structure types, on the same subframe (Step S403). In a case the multiple cells in the different frame structure types are not aggregated (NO in S401), that is, in a case where the multiple cells in a case where the same frame structure types are aggregated, proceeding to processing 3 takes place. Furthermore, in a case where the function of performing the transmission and reception at the same time in the multiple cells in the different frame structure types is not retained (NO in S402), proceeding to processing 2 takes place.

An example of the processing 2 will be described below.

In a case where the multiple cells to which the different frame structure types are applied are aggregated and where the terminal device 2 does not retain the function (the performance or the capability) of performing the transmission and reception at the same time between the multiple cells that are aggregated, according to a type of subframe of the primary cell, the terminal device 2 determines whether or not to perform the transmission and reception at the same time in the secondary cell on the same subframe.

Furthermore, in a case where the multiple cells to which the different frame structure types are applied are aggregated and where the terminal device 2 does not retain the function of performing the transmission and reception at the same time between the multiple cells that are aggregated, if the subframe of the primary cell is the downlink subframe, the terminal device 2 does not perform the transmission of the uplink signal (whatever channel or signal that includes the uplink signal) in the secondary cell on the same sub frame.

Furthermore, in the case where the multiple cells to which the different frame structure types are applied are aggregated and where the terminal device 2 does not retain the function of performing the transmission and reception at the same time between the multiple cells that are aggregated, if the subframe of the primary cell is the uplink subframe (effective uplink subframe) of which the uplink transmission is requested, the terminal device 2 does not expect that the downlink signal can be received in the secondary cell on the same subframe. That is, in this case, the terminal device 2 does not expect that the downlink signal is transmitted from the base station apparatus 1 (that the downlink transmission takes place). For this reason, in this case, the terminal device 2 may not perform the reception of the downlink signal in the secondary cell.

Furthermore, in the case where the multiple cells to which the different frame structure types are applied are aggregated and where the terminal device 2 does not retain the function of performing the transmission and reception at the same time between the multiple cells that are aggregated, if the subframe of the primary cell is the uplink subframe (ineffective uplink subframe) of which the uplink transmission is not requested, the terminal device 2 may perform the reception of the downlink signal in the secondary cell on the same subframe.

Furthermore, in the case where the multiple cells to which the different frame structure types are applied are aggregated and where the terminal device 2 does not retain the function of performing the transmission and reception at the same time between the multiple cells that are aggregated, if the uplink transmission on a certain subframe in the secondary cell is requested by cross subframe scheduling in the primary cell (or the secondary cell), the terminal device 2 does not expect that the downlink signal can be received in the primary cell on the same subframe. That is, in this case, the terminal device 2 does not expect that the downlink signal is transmitted from the base station apparatus 1. For this reason, in this case, the terminal device 2 may not perform the reception of the downlink signal.

Furthermore, in the case where the multiple cells to which the different frame structure types are applied are aggregated and where the terminal device 2 does not retain the function of performing the transmission and reception at the same time between the multiple cells that are aggregated, if the uplink transmission on a certain subframe in the secondary cell is requested by multi-subframe scheduling or by the cross subframe scheduling in the primary cell (the secondary cell), the terminal device 2 does not expect that the downlink signal can be received in the primary cell on the same subframe. That is, in this case, the terminal device 2 does not expect that the downlink signal is transmitted from the base station apparatus 1. For this reason, in this case, the terminal device 2 may not perform the reception of the downlink signal.

Furthermore, in the case where the multiple cells to which the different frame structure types are applied are aggregated and where the terminal device 2 does not retain the function of performing the transmission and reception at the same time between the multiple cells that are aggregated, if the downlink transmission on the subframe in the secondary cell is indicated by the multi-subframe scheduling or by the cross subframe scheduling in the primary cell (or the secondary cell), the terminal device 2 does not expect that the uplink signal can be transmitted in the primary cell on the same subframe. That is, in this case, the terminal device 2 does not expect that the uplink transmission is requested in that subframe. For this reason, in this case, the terminal device 2 may not perform the transmission of the uplink signal. For example, although the same subframe as the transmission subframe for the P-SRS is present, P-SRS transmission may be dropped.

Furthermore, in the case where the multiple cells to which the different frame structure types are applied are aggregated and where the terminal device 2 does not retain the function of performing the transmission and reception at the same time between the multiple cells that are aggregated, if the subframe of the primary cell is the special subframe, the terminal device 2 does not expect that the PDSCH/EPDCCH/PMCH/PRS can be received in the secondary cell on the same subframe. Furthermore, in this case, the terminal device 2 may not transmit PUSCH/PUCCH/PRACH formats 1 to 3.

Furthermore, in the case where the multiple cells to which the different frame structure types are applied are aggregated and where the terminal device 2 does not retain the function of performing the transmission and reception at the same time between the multiple cells that are aggregated, if the special subframe of the primary cell and the downlink subframe of the secondary cell are the same subframe, the terminal device 2 does not expect that the downlink signal can be received on the OFDM symbol of the secondary cell that overlaps the guard period and the UpPTS within the subframe of the primary cell. In this case, the terminal device 2 may not perform the reception of the downlink signal. Furthermore, in this case, the downlink signal (for example, the PDCCH) may be received on the OFDM symbol of the secondary cell that does not overlap the guard period and the UpPTS within the subframe of the primary cell.

Furthermore, in the case where the multiple cells to which the different frame structure types are applied are aggregated and where the terminal device 2 does not retain the function of performing the transmission and reception at the same time between the multiple cells that are aggregated, if the special subframe of the primary cell and the uplink subframe of the secondary cell are the same subframe, the terminal device 2 does not expect that the uplink signal can be transmitted on an SC-FDMA symbol (the OFDM symbol) of the secondary cell that overlaps the guard period and the DwPTS within the subframe of the primary cell. In this case, the terminal device 2 may not transmit the uplink signal. Furthermore, in this case, the uplink signal (for example, the SRS or a PRACH format 4 that is able to be mapped to the UpPTS) may be transmitted on the SC-FDMA symbol of the secondary cell that does not overlap the guard period and the DwPTS within the subframe of the primary cell.

Furthermore, in the case where the multiple cells to which the different frame structure types are applied are aggregated and where the terminal device 2 does not retain the function of performing the transmission and reception at the same time between the multiple cells that are aggregated, when the uplink transmission on a certain subframe in a certain cell, among multiple cells, is requested, although the downlink subframe is present in a different cell, it is not expected that the downlink signal can be received on that downlink subframe. In other words, the terminal device 2 does not expect that the downlink signal is transmitted, on the same subframe as in a different cell, from the base station apparatus 1. That is, in this case, the terminal device 2 does not expect that the downlink signal is transmitted from the base station apparatus 1. For this reason, in this case, the terminal device 2 may not perform the reception of the downlink signal.

Furthermore, in a case where the multiple cells to which the different frame structure types are applied are aggregated and where the terminal device 2 retains neither the function of performing the transmission and reception at the same time between the multiple cells that are aggregated, nor a function of performing uplink carrier aggregation, if the uplink transmission on the subframe of the primary cell is requested, the terminal device 2 does not perform the transmission of the uplink signal and the reception of the downlink signal at the same time on the secondary cell on the same subframe. Furthermore, if the uplink transmission on a certain subframe in the secondary cell is requested by the cross carrier scheduling (or the cross subframe scheduling or the multi-subframe scheduling), the transmission of the uplink signal and the reception of the downlink signal may not be performed in the primary cell on the same subframe.

Furthermore, in a case where the multiple cells to which the different frame structure types are applied are aggregated and where the terminal device 2 retains neither the function of performing the transmission and reception at the same time between the multiple cells that are aggregated, nor a function of performing downlink carrier aggregation, if the uplink transmission on a certain subframe of the primary cell is requested, it is not expected that the downlink signal can be received in the secondary cell on the same subframe. Furthermore, if the uplink transmission on a certain subframe in the secondary cell is requested by the cross carrier scheduling (or the cross subframe scheduling or the multi-subframe scheduling), it is not expected that the downlink signal can be received in the primary cell on the same subframe. That is, in this case, the terminal device 2 does not expect that the downlink signal is transmitted from the base station apparatus 1. For this reason, in this case, the terminal device 2 may not perform the reception of the downlink signal.

Furthermore, in a case where the multiple cells to which the different frame structure types are applied are aggregated and where the terminal device 2 does not retain the function of performing the transmission and reception at the same time in the uplink between the multiple cells that are aggregated, if the subframe of the primary cell is the downlink subframe, the terminal device 2 does not transmit the uplink signal in the secondary cell on the same subframe.

Furthermore, in the case where the multiple cells to which the different frame structure types are applied are aggregated and where the terminal device 2 does not retain the function of performing the transmission and reception at the same time in the uplink between the multiple cells that are aggregated, if the subframe of the primary cell is the special subframe, the terminal device 2 does not expect that the PDSCH/EPDCCH/PMCH/PRS can be received in the secondary cell on the same subframe. In this case, the terminal device 2 may not perform the reception of the PDSCH/EPDCCH/PMCH/PRS. Furthermore, in this case, the terminal device 2 may not transmit the PUSCH/PUCCH/PRACH formats 1 to 3.

Furthermore, in a case where the multiple cells to which the different frame structure types are applied are aggregated and where the terminal device 2 does not retain the function of performing the transmission and reception at the same time in the downlink between the multiple cells that are aggregated, if the subframe of the primary cell is the uplink subframe, the terminal device 2 does not expect that the downlink signal can be received in the secondary cell on the same subframe. That is, the terminal device 2 may not perform the reception of the downlink signal.

Furthermore, in the case where the multiple cells to which the different frame structure types are applied are aggregated and where the terminal device 2 does not retain the function of performing the transmission and reception at the same time in the downlink between the multiple cells that are aggregated, if the special subframe of the primary cell and the uplink subframe of the secondary cell are the same subframe, the terminal device 2 does not expect that the uplink signal can be transmitted on an SC-FDMA symbol (the OFDM symbol) of the secondary cell that overlaps the guard period and the DwPTS within the subframe of the primary cell. In this case, the terminal device 2 may not transmit the uplink signal. Furthermore, in this case, the uplink signal (for example, the SRS or the PRACH format 4 that is able to be mapped to the UpPTS) may be transmitted on the SC-FDMA symbol of the secondary cell that does not overlap the guard period and the DwPTS within the subframe of the primary cell.

Furthermore, in a case where the multiple cells to which the different frame structure types are applied are aggregated and where the terminal device 2 does not retain the function of performing the transmission and reception at the same time in the uplink in secondary cell among the multiple cells that are aggregated, if the subframe of the primary cell is the downlink subframe, the terminal device 2 does not transmit the uplink signal in the secondary cell on the same subframe.

Furthermore, in the case where the multiple cells to which the different frame structure types are applied are aggregated and where the terminal device 2 does not retain the function of performing the transmission and reception at the same time in the uplink in the secondary cell among the multiple cells that are aggregated, if the subframe of the primary cell is the special subframe, the terminal device 2 does not expect that the PDSCH/EPDCCH/PMCH/PRS can be received in the secondary cell on the same subframe. In this case, the terminal device 2 may not perform the reception of the PDSCH/EPDCCH/PMCH/PRS. Furthermore, in this case, the terminal device 2 may not transmit the PUSCH/PUCCH/PRACH formats 1 to 3.

Furthermore, in a case where the multiple cells to which the different frame structure types are applied are aggregated and where the terminal device 2 does not retain the function of performing the transmission and reception at the same time in the downlink in the secondary cell among the multiple cells that are aggregated, if the subframe of the primary cell is the uplink subframe, the terminal device 2 does not expect that the downlink signal can be received in the secondary cell on the same subframe. That is, the terminal device 2 may not perform the reception of the downlink signal.

Furthermore, in the case where the multiple cells to which the different frame structure types are applied are aggregated and where the terminal device 2 does not retain the function of performing the transmission and reception at the same time in the downlink in the secondary cell among the multiple cells that are aggregated, if the special subframe of the primary cell and the uplink subframe of the secondary cell are the same subframe, the terminal device 2 does not expect that the uplink signal can be transmitted on an SC-FDMA symbol (the OFDM symbol) of the secondary cell that overlaps the guard period and the DwPTS within the subframe of the primary cell. In this case, the terminal device 2 may not transmit the uplink signal. Furthermore, in this case, the uplink signal (for example, the SRS or the PRACH format 4 that is able to be mapped to the UpPTS) may be transmitted on the SC-FDMA symbol of the secondary cell that does not overlap the guard period and the DwPTS within the subframe of the primary cell.

At this point, the aggregation of the multiple cells to which the different frame structure types are applied, for example, includes aggregating a cell of which the frame structure type is the type 1 (FDD) and a cell of which the frame structure type is the type 2 (TDD). Furthermore, the aggregation of the multiple cells to which the different frame structure types are applied, for example, includes aggregating multiple cells of which the frame structure types are the types 1 (FDDs) and multiple cells of which the frame structure types are the types 2 (TDDs). To be more precise, the aggregation of the multiple cells to which the different frame structure types are applied, for example, includes aggregating one or more cells of which the frame structure types are the types 1 (FDDs) and one or more cells of which the frame structure types are the types 2 (TDDs). Moreover, this is based on one example of the frame structure types and may be applied in the same manner even in a case where a type 3 or a type 4 is defined.

Furthermore, in a case where the frame structure type for the primary cell is FDD and the frame structure type for at least one secondary cell among the secondary cells is TDD, and where the terminal device 2 does not retain the function of performing the transmission and reception at the same time between the multiple cells in the different frame structure types, which are aggregated, the terminal device 2 does not transmit the uplink signal on the uplink subframe in the secondary cell for which TDD is configured.

Furthermore, in the case where the frame structure type for the primary cell is FDD and the frame structure type for at least one secondary cell among the secondary cells is TDD, and where the terminal device 2 does not retain the function of performing the transmission and reception at the same time between the multiple cells interval the different frame structure types, which are aggregated, if the uplink transmission on a certain subframe in the primary cell is requested, the terminal device 2 may not receive the downlink signal in the secondary cell on the same subframe. In other words, if the uplink transmission on a certain subframe in the primary cell is requested, the terminal device 2 does not expect that the downlink signal is transmitted from the base station apparatus 1 in the secondary cell on the same subframe.

Furthermore, in the case where the frame structure type for the primary cell is FDD and the frame structure type for at least one secondary cell among the secondary cells is TDD, and where the terminal device 2 does not retain the function of performing the transmission and reception at the same time between the multiple cells in the different frame structure types, which are aggregated, if half duplex is supported for an FDD band for the primary cell, the terminal device 2 does not need to perform monitoring of the downlink subframe, PDCCH or CRS in the primary cell at all times. Because of this, in a case where switching from the downlink subframe to the uplink subframe takes place in the primary cell, the terminal device 2 may perform the transmission of the uplink signal in the secondary cell on the same subframe. Furthermore, in the same manner, in this case, the terminal device 2 does not expect that the downlink signal can be received in the secondary cell on the same subframe as the subframe on which the uplink transmission is requested in the primary cell, but the terminal device 2 may perform the reception of the downlink signal in the secondary cell on the same subframe as the subframe on which the uplink transmission is not requested in the primary cell.

Furthermore, in the case where the primary cell is in FDD and at least one secondary cell among the secondary cells is in TDD, and where the terminal device 2 does not retain the function of performing the transmission and reception at the same time between the multiple cells in the different frame structure types, which are aggregated, if the uplink transmission on a certain subframe in the secondary cell is requested by the cross carrier scheduling (or the cross subframe scheduling or the multi-subframe scheduling), the terminal device 2 may not receive the downlink signal in the primary cell on the same subframe. In other words, if the uplink transmission on a certain subframe in the secondary cell is requested by the cross carrier scheduling (or the cross subframe scheduling or the multi-subframe scheduling), the terminal device 2 does not expect that the downlink signal is transmitted from the base station apparatus 1 in the primary cell on the same subframe. Furthermore, in a case where the downlink transmission on a certain subframe in the secondary cell is indicated by the cross carrier scheduling (or the cross subframe scheduling or the multi-subframe scheduling), the terminal device 2 may not transmit the uplink signal in the primary cell on the same subframe.

Furthermore, in the case where the primary cell is in TDD and at least one secondary cell among the secondary cells is in FDD, and where the terminal device 2 does not retain the function of performing the transmission and reception at the same time between the multiple cells in the different frame structure types, which are aggregated, if the subframe in the primary cell is the downlink subframe, the terminal device 2 may not transmit the uplink signal on the same subframe in the secondary cell.

Furthermore, in the case where the primary cell is in TDD and at least one secondary cell among the secondary cells is in FDD, and where the terminal device 2 does not retain the function of performing the transmission and reception at the same time between the multiple cells in the different frame structure types, which are aggregated, if the uplink signal is scheduled in a certain subframe in the primary cell, the terminal device 2 does not expect that the downlink signal is transmitted from the base station apparatus 1 on the same subframe in the secondary cell. If the uplink transmission on a certain subframe in the primary cell is not requested, the terminal device 2 may receive the downlink signal in the secondary cell on the same subframe.

Furthermore, in the case where the primary cell is in TDD and at least one secondary cell among the secondary cells is in FDD, and where the terminal device 2 does not retain the function of performing the transmission and reception at the same time between the multiple cells in the different frame structure types, which are aggregated, if the uplink transmission on a certain subframe in the secondary cell is requested by the cross carrier scheduling (or the cross subframe scheduling or the multi-subframe scheduling), the terminal device 2 does not expect that the downlink signal is transmitted from the base station apparatus 1 in the primary cell on the same subframe. Furthermore, if the downlink transmission on a certain subframe in the secondary cell is indicated by the cross carrier scheduling (or the cross subframe scheduling or the multi-subframe scheduling), the terminal device 2 may not transmit the uplink signal on the same subframe in the primary cell.

Furthermore, in the case where the primary cell is in TDD and at least one secondary cell among the secondary cells has a different TDD UL/DL configuration than the primary cell and where the terminal device 2 does not retain the function of performing the transmission and reception at the same time between the multiple cells in the different frame structure types, which are aggregated, the terminal device 2 may not perform the transmission and reception on the same subframe in the primary cell and the secondary cell. Moreover, the TDD UL/DL configurations for the multiple cells, which are compared, may be uplink reference TDD UL/DL configurations. Furthermore, the TDD UL/DL configurations for the multiple cells, which are compared, may be downlink reference TDD UL/DL configurations. Furthermore, the TDD UL/DL configurations for the multiple cells, which are compared, may be the TDD UL/DL configurations that are transmitted on the SIB 1. Furthermore, the TDD UL/DL configurations for the multiple cells, which are compared, may be the TDD UL/DL configurations that are transmitted with the RRC signaling (may be the TDD UL/DL configurations on which the signaling is performed with RRC). Furthermore, one among the TDD UL/DL configurations for the multiple cells, which are compared, may be transmitted on the SIB 1, and another one may be transmitted with the RRC signaling.

Moreover, in a case where the multiple cells in the same frame structure types are aggregated, if the frame structure type is in FDD, the transmission and reception may be performed at the same time between the cells. Furthermore, in the case where the multiple cells in the same frame structure types are aggregated, if the frame structure type is in TDD, whether or not the transmission and reception may be performed at the same time may be determined depending on whether or not different TDD UL/DL configurations are set between the cells.

At this point, the request for the uplink transmission may be the scheduling of the uplink signal by a grant (a dynamic scheduled grant, a semi-persistent scheduling grant, a random access response grant, or an uplink grant). Furthermore, the request for the uplink transmission may be the request for the PUSCH or the SRS, which results from the SRS request or the CSI request that is included in the DCI format. Furthermore, the request for the uplink transmission may be the scheduling of the uplink signal with a parameter that is configured by the higher layer. At this point, the uplink subframe on which the uplink transmission is requested is referred to as the effective uplink subframe. Furthermore, the uplink subframe on which the uplink subframe is not requested is referred to as the ineffective uplink subframe.

Furthermore, the effective downlink subframe may be a subframe to which a PDSCH resource is allocated by the downlink grant. Furthermore, the effective downlink subframe may be the downlink subframe for which a transmission interval, a reception interval, or a measurement interval for the downlink signal is configured by the higher layer. For example, the effective downlink subframe may be indicated in a bitmap manner by a CSI measurement subframe set. Furthermore, the effective downlink subframe may be indicated in a bitmap manner by a measurement subframe pattern. The downlink subframe to be measured may be indicated by the periodicity and the subframe offset. In the downlink subframe for which the measurement interval is not indicated by the higher layer, the terminal device 2 may not expect that the downlink signal is transmitted on the ineffective downlink subframe.

Figure 5:
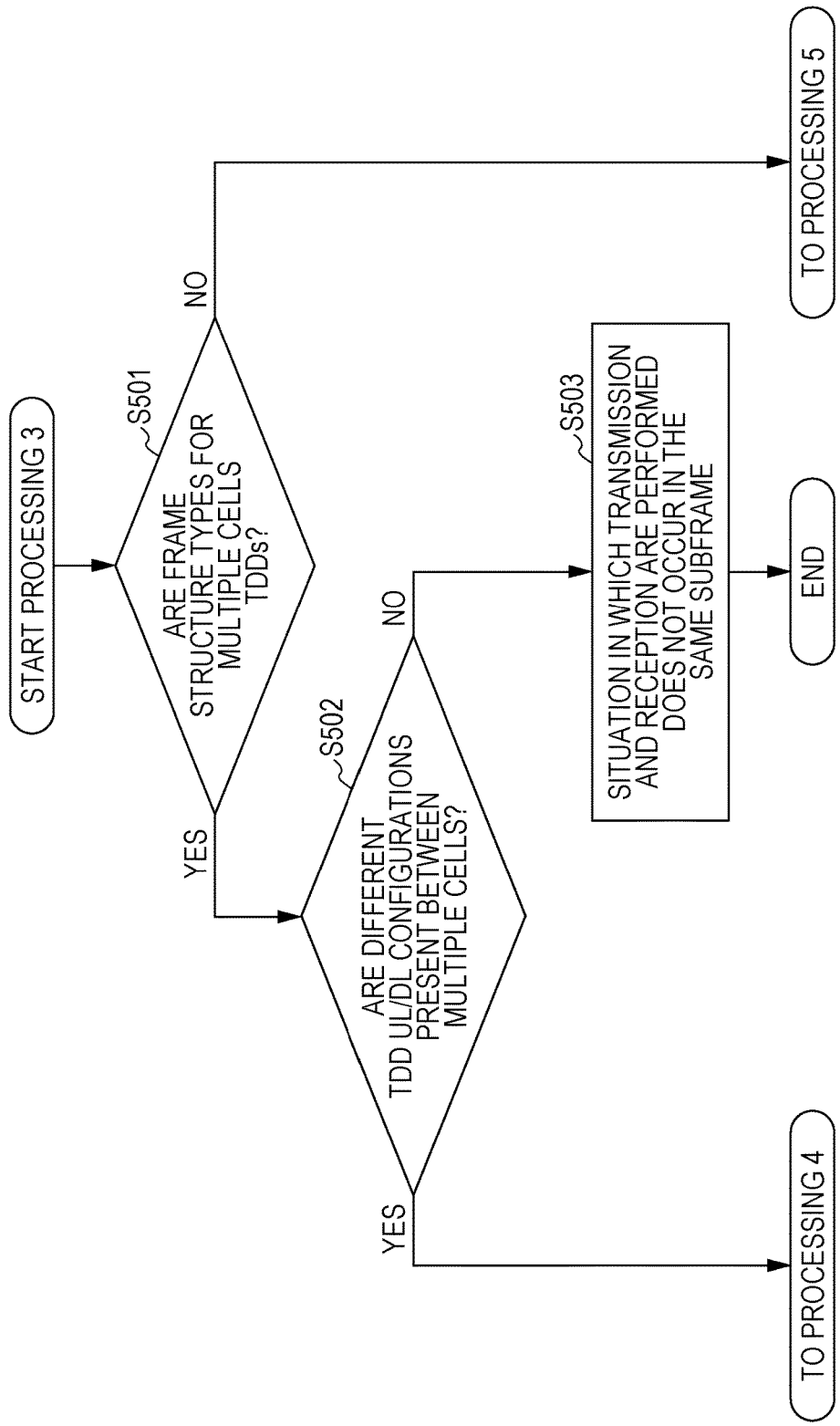
FIG. 5 is a flowchart illustrating a procedure for processing 3 by the terminal device 2 according to the first embodiment of the present invention.

FIG. 5 is a flowchart illustrating a procedure for the processing 3 by the terminal device 2 according to the first embodiment. A determination of whether or not the frame structure types for the multiple cells that are aggregated are TDDs is made (Step S501). In a case where the frame structure types for the multiple cells that are aggregated are TDDs (YES in S501), a determination of whether or not different TDD UL/DL configurations is set between the multiple cells is made (S502). In a case where the different TDD UL/DL configurations are set between the multiple cells (YES in S502), proceeding to processing 4 takes place. In a case where the different TDD UL/DL configurations are not set between the multiple cells (NO in S502), that is, in a case where the same TDD UL/DL configurations are set between the multiple cells, although in the multiple cells on the same subframe, the transmission at the same time or the reception at the same time is possible, because the transmission and reception are not performed at the same time, subsequent processing does not take place (Step S503). In a case where the frame structure types for the multiple cells that are aggregated are not TDDs (NO in S501), for example, in a case where the frame structure types for the multiple cells are FDDs, proceeding to processing 5 takes place.

An example of the processing 4 will be described below.

In a case where the multiple cells that have the different TDD UL/DL configurations are aggregated and where the terminal device 2 does not retain the function of performing the transmission and reception at the same time between the multiple cells that are aggregated, according to a type of subframe of the primary cell, the terminal device 2 determines whether or not the transmission and reception are performed at the same time in the secondary cell on the same subframe.

Furthermore, in a case where the multiple cells that have the different TDD UL/DL configurations are aggregated and where the terminal device 2 does not retain the function of performing the transmission and reception at the same time between the multiple cells that are aggregated, if the subframe of the primary cell is the downlink subframe, the terminal device 2 does not perform the transmission of the uplink signal (whatever channel or signal that includes the uplink signal) in the secondary cell on the same subframe.

Furthermore, in a case where the multiple cells that have the different TDD UL/DL configurations are aggregated and where the terminal device 2 does not retain the function of performing the transmission and reception at the same time between the multiple cells that are aggregated, if the subframe of the primary cell is the uplink subframe, the terminal device 2 does not expect that the downlink signal can be received in the secondary cell on the same subframe. That is, in this case, the terminal device 2 does not expect that the downlink signal is transmitted from the base station apparatus 1. For this reason, in this case, the terminal device 2 may not perform the reception of the downlink signal in the secondary cell.

Furthermore, in the case where the multiple cells that have the different TDD UL/DL configurations are aggregated and where the terminal device 2 does not retain the function of performing the transmission and reception at the same time between the multiple cells that are aggregated, if the subframe of the primary cell is the special subframe, the terminal device 2 does not expect that the PDSCH/EPDCCH/PMCH/PRS can be received in the secondary cell on the same subframe. Furthermore, in this case, the terminal device 2 may not transmit the PUSCH/PUCCH/PRACH formats 1 to 3.

Furthermore, in the case where the multiple cells that have the different TDD UL/DL configurations are aggregated and where the terminal device 2 does not retain the function of performing the transmission and reception at the same time between the multiple cells that are aggregated, if the special subframe of the primary cell and the downlink subframe of the secondary cell are the same subframe, the terminal device 2 does not expect that the downlink signal can be received on the OFDM symbol of the secondary cell that overlaps the guard period and the UpPTS within the subframe of the primary cell. In this case, the terminal device 2 may not perform the reception of the downlink signal. Furthermore, in this case, the downlink signal (for example, the PDCCH) may be received on the OFDM symbol of the secondary cell that does not overlap the guard period and the UpPTS within the subframe of the primary cell.

An example of the processing 5 will be described below.

In a case where the frame structure types for the multiple cells are FDDs, the terminal device 2 determines whether or not to perform the transmission and reception at the same time between the multiple cells, depending on whether or not the uplink carrier aggregation and/or the downlink carrier aggregation are/is applied in different FDD bands (FDD bands in the duplex mode) that are aggregated at the same time. In a case where the uplink carrier aggregation and/or the downlink carrier aggregation are/is possible in the different FDD bands that are aggregated at the same time, the transmission and reception can be performed at the same time in the multiple cells on the same subframe. In a case where the half duplex is applied in the different FDD bands, the transmission and reception may not be performed at the same time in the multiple cells on the same subframe. Furthermore, in a case where the terminal device 2 has two or more wireless transmission units and/or wireless reception units (wireless transmission and reception units or RF units), the transmission and reception may be performed at the same time between the multiple cells.

Furthermore, the present embodiment may be applied to different bands (E-UTRA operating bands, E-UTRA bands, or bands).

At this point, in some cases, when it comes to the duplex mode, a band in TDD is referred to as a TDD band, and when it comes to the duplex mode, a band in FDD is referred to as an FDD band. In some cases, in the same manner, when it comes to the frame structure type, a cell (a carrier) in FDD (type 1) is referred to as a FDD cell (a FDD carrier), and when it comes to the frame structure type, a cell (a carrier) in TDD (type 2) is referred to as a TDD cell (a TDD carrier).

In a case where the terminal device 2 that performs the cell aggregation retains the function of performing the transmission and reception at the same time between the multiple cells in different bands, the terminal device 2 may perform the transmission and reception at the same time on the same subframe in the multiple cells in the different bands. In a case where the multiple cells in which the duplex mode is TDD are present, although the TDD UL/DL configurations for the multiple cells (the TDD cells) are different from one another, the transmission and reception may be able to be performed at the same time. The cell aggregation may determinate whether or not the cell aggregation can be performed in the multiple TDD cells, depending on whether or not the terminal device 2 retains the function of performing the transmission and reception at the same time in the cell aggregation between the different bands in which TDD is supported.

Furthermore, in a case where the multiple cells that have the different bands are aggregated and where the terminal device 2 does not retain the function of performing the transmission and reception at the same time between the multiple cells in the different bands, if the subframe of the primary cell is the downlink subframe, the terminal device 2 does not transmit the uplink signal (the physical channel or the physical signal) in the secondary cell on the same subframe.

Furthermore, in a case where the multiple cells that have the different bands are aggregated and where the terminal device 2 does not retain the function of performing the transmission and reception at the same time between the multiple cells in the different bands, if in the same subframe, the subframe of the primary cell is the special subframe and the subframe of the secondary cell is the downlink subframe, the terminal device 2 does not expect that the PDSCH/EPDCCH/PMCH/PRS can be received in the secondary cell.

Furthermore, in the case where the multiple cells that have the different bands are aggregated and where the terminal device 2 does not retain the function of performing the transmission and reception at the same time between the multiple cells in the different bands, if in the same subframes, the subframe of the primary cell is the special subframe and the subframe of the secondary cell is the downlink subframe, the terminal device 2 does not expect that a different signal (the downlink signal) can be received on the OFDM symbol of the secondary cell that overlaps the guard period and the UpPTS in the primary cell.

Furthermore, in a case where the multiple cells in the different bands are aggregated and where the terminal device 2 does not retain the function of performing the transmission and reception at the same time between the multiple cells in the different bands, if the subframe of the primary cell is the uplink subframe on which the uplink transmission is requested, the terminal device 2 does not expect that the downlink signal can be received on the same subframe in the secondary cell.

Furthermore, in the case where the multiple cells in the different bands are aggregated and where the terminal device 2 does not retain the function of performing the transmission and reception at the same time between the multiple cells in the different bands, if the subframe of the secondary cell is the uplink subframe on which the uplink transmission is requested, the terminal device 2 does not expect that the downlink signal can be received on the same subframe in the primary cell.

To be more precise, in the case where the multiple cells in the different bands are aggregated and where the terminal device 2 does not retain the function of performing the transmission and reception at the same time between the multiple cells in the different bands, if regardless of whether the cell is the primary cell or the secondary cell, the uplink subframe on which the uplink transmission is requested in a certain cell is present, the terminal device 2 may not perform the reception of the downlink signal on the same subframe in a different cell.

Furthermore, in the case where the multiple cells in the different bands are aggregated and where the terminal device 2 does not retain the function of performing the transmission and reception at the same time between the multiple cells in the different bands, if regardless of whether the cell is the primary cell or the secondary cell, the uplink subframe on which the uplink transmission is requested is not present in a cell that is supported by the terminal device 2, the terminal device 2 may receive the downlink signal on the same subframe.

In a case where the multiple cells in the different bands are aggregated and where the terminal device 2 retains neither the function of performing the transmission and reception at the same time between the multiple cells in the different bands, nor the function of performing the uplink carrier aggregation between the bands that are supported by the terminal device 2, if the uplink signal on a certain subframe in the primary cell is requested, the terminal device 2 does not perform the transmission of the uplink signal and the reception of the downlink signal in the secondary cell on the same subframe. Furthermore, if the uplink transmission on a certain subframe in the secondary cell is requested by the cross carrier scheduling (or the cross subframe scheduling or the multi-subframe scheduling), the transmission of the uplink signal and the reception of the downlink signal is not performed in the primary cell on the same subframe.

In a case where the multiple cells in the different bands are aggregated and where the terminal device 2 retains neither the function of performing the transmission and reception at the same time between the multiple cells in the different bands, nor the function of performing the downlink carrier aggregation between the bands that are supported by the terminal device 2, if the uplink signal on a certain subframe in the primary cell is requested, the terminal device 2 may not perform the reception of the downlink signal in the secondary cell on the same subframe. Furthermore, if the uplink transmission on a certain subframe in the secondary cell is requested by the cross carrier scheduling (or the cross subframe scheduling or the multi-subframe scheduling), the terminal device 2 may not perform the reception of the downlink signal in the primary cell on the same subframe. In this case, the terminal device 2 does not expect that the downlink signal can be received. Furthermore, if the downlink transmission on a certain subframe in the secondary cell is indicated by the cross carrier scheduling (or the cross subframe scheduling or the multi-subframe scheduling), the terminal device 2 may not perform the transmission of the uplink signal in the primary cell on the same subframe.

According to the present embodiment, in a case where a subframe for measuring the CRS or the CSI-RS and a subframe for monitoring the PDCCH or the EPDCCH are configured with the higher layer signaling for each of the multiple cells, if the uplink transmission to the first cell is not requested in that subframe, the terminal device 2 may measure the CRS or the CSI-RS for the second cell and may monitor the PDCCH or the EPDCCH. Furthermore, in a case where in that subframe, a second P-SRS transmission to the first cell takes place, the P-SRS transmission may be dropped. Furthermore, in a case where in that subframe, transmission of the PUCCH that is accompanied by the CSI, to the first cell takes place, transmission of the PUCCH that is accompanied by the CSI may take precedence, the CRS or the CSI-RS may not be measured for the second cell, and the PDCCH or the EPDCCH may not be monitored. Further-more, in a case where in that subframe, the transmission of the PUCCH that is accompanied by the HARQ-ACK and/or the SR, to the first cell takes place, the transmission of the PUCCH that is accompanied by the HARQ-ACK and/or the SR may take precedence, the CRS or the CSI-RS may not be measured for the second cell, and the PDCCH or the EPDCCH may not be monitored.

According to the present embodiment, in a case where the subframe for measuring the CRS or the CSI-RS, and the subframe for monitoring the PDCCH or the EPDCCH are not configured with the higher layer signaling, and in a case where the P-SRS transmission on the uplink subframe in the first cell, which, in the same subframe, is the uplink subframe in the first cell and the downlink subframe in the second cell, takes place, the terminal device 2 may transmit the P-SRs on that subframe, if the PDCCH cannot be detected in the second cell, the terminal device 2 may transmit the P-SRS on that subframe.

According to the present embodiment, in a case where the multiple cells in the TDD band and the TDD band are aggregated and where the terminal device 2 does not retain the function of performing the transmission and reception at the same time in the multiple cells that are aggregated, the terminal device 2 may support only the half duplex in that FDD band (a cell in the FDD band) (may not support full duplex in that FDD band). In this case, whether or not the half duplex is supported in the FDD band that is applied to at least one cell among the multiple cells that are aggregated may be associated with whether or not a function of performing the transmission and reception at the same time in the cell in the TDD band and the cell in the FDD band that are aggregated is supported.

Furthermore, in a case where the multiple cells in the TDD band and the FDD band are aggregated and where the function of performing the transmission and reception at the same time in the multiple cells that are aggregated is present, whether the half duplex or the full duplex is available in that FDD band may be determined depending on whether or not the half duplex is supported in that FDD band. That is, in this case, whether or not the half duplex is supported in that FDD band may be independently indicated.

FIG. 1 is a schematic block diagram illustrating a configuration of the base station apparatus 1 according to the present invention. As illustrated, the base station apparatus 1 is configured to include a higher layer processing unit 101, a control unit 103, a reception unit 105, a transmission unit 107, a channel measurement unit 109, and a transmit and receive antenna 111. Furthermore, the reception unit 105 is configured to include a decoding unit 1051, a demodulation unit 1053, a demultiplexing unit 1055, and a wireless reception unit 1057. Furthermore, reception processing by the base station apparatus 1 is performed in the higher layer processing unit 101, the control unit 103, the reception unit 105, and the transmit and receive antenna 111. Furthermore, the transmission unit 107 is configured to include a coding unit 1071, a modulation unit 1073, a multiplexing unit 1075, a wireless transmission unit 1077, and a downlink reference signal generation unit 1079. Furthermore, transmission processing by the base station apparatus 1 is performed in the higher layer processing unit 101, the control unit 103, the transmission unit 107, and the transmit and receive antenna 111.

The higher layer processing unit 101 performs processing of a medium access control (MAC) layer, a packet data convergence protocol (PDCP) layer, a radio link control (RLC) layer, and a radio resource control (RRC) layer.

The higher layer processing unit 101 generates information that is arranged in each channel for the downlink, or acquires such information from a higher node, and outputs the generated or acquired information to the transmission unit 107. Furthermore, the higher layer processing unit 101 allocates a radio resource to which the terminal device 2 allocates the physical uplink shared channel (PUSCH) that is uplink data information, from uplink radio resources. Furthermore, the higher layer processing unit 101 determines a radio resource to which the physical downlink shared channel (PDSCH) that is downlink data information is allocated, from downlink radio resources.

The higher layer processing unit 101 generates downlink control information indicating the allocation of the radio resource, and transmits the generated downlink control information to the terminal device 2 through the transmission unit 107.

When the radio resource to which the PUSCH is allocated, the higher layer processing unit 101 preferentially allocates a radio resource that has good channel quality, based on a result of uplink channel measurement that is received from the channel measurement unit 109. To be more precise, the higher layer processing unit 101 generates pieces of information relating to configurations of various downlink signals and pieces of information relating to configurations of various uplink signals for a certain terminal device or a certain cell.

Furthermore, the higher layer processing unit 101 may generate the pieces of information relating to the configurations of the various downlink signals and the pieces of information relating to the configurations of the various uplink signals for each cell. Furthermore, the higher layer processing unit 101 may generate the pieces of information relating to the configurations of the various downlink signals and the pieces of information relating to the configurations of the various uplink signals for every terminal device 2.

Furthermore, the higher layer processing unit 101 may generate pieces of information relating to first to n-th configurations (n is a natural number), for a certain terminal device 2 or a certain cell, to be more precise, in a UE-specific and/or cell-specific manner, and may transmit the pieces of information relating to the first to n-th configurations to the terminal device 2 through the transmission unit 107. For example, the information relating to the configuration of the downlink signal and/or the uplink signal may include a parameter relating to the resource allocation.

Furthermore, the information relating to the configuration of the downlink signal and/or the uplink signal may include a parameter that is used for sequence calculation. Moreover, in some cases, the radio resource is referred to as a time frequency resource, a subcarrier, a resource element (RE), a resource element group (REG), a control channel element (CCE), a resource block (RB), a resource block group (RBG), or the like.

The configuration information and the control information may be defined as the information element. Furthermore, the configuration information and the control information may be defined as the RRC message. Furthermore, the configuration information and the control information may be transmitted with the system information to the terminal device 2. Furthermore, the configuration information and the control information may be transmitted with the dedicated signaling to terminal device 2.

Furthermore, the higher layer processing unit 101 sets at least one TDD UL/DL configuration (TDD UL/DL configuration(s), TDD config, tdd-Config, or uplink-downlink configuration(s)) for a system information block type 1. The TDD UL/DL configuration may be defined as illustrated in FIG. 3. A configuration of TDD may be indicated by configuring an index. Additionally, a second TDD UL/DL configuration may be set as a downlink reference. Furthermore, multiple types for system information blocks may be prepared. For example, the system information block type 1 includes an information element relating to the TDD UL/DL configuration.

Furthermore, the system information block type 2 includes an information element relating to the radio resource control. Moreover, a certain information element may include a parameter relating to the certain information element, as an information element. For example, a so-called parameter in the physical layer may be defined as an information element in the higher layer.

Moreover, according to the present invention, an identity, an identifier, or an identification is referred to as an ID (an identifier, an identification code, or an identification number). As IDs (UE IDs) that are configured in a UE-specific manner, there are a cell radio network temporary identifier (C-RNTI), a semi-persistent scheduling C-RNTI (SPS C-RNTI), a temporary C-RNTI, a TPC-PUSCH RNTI, a TPC-PUCCH RNTI, and a random value for contention resolution. These IDs are used on a cell basis. The IDs are configured by the higher layer processing unit 101.

Furthermore, the higher layer processing unit 101 configures various identifiers for the terminal devices 2, and notifies the terminal device 2 of the various identifiers through the transmission unit 107. For example, the RNTI is configured and notified to the terminal device 2. Furthermore, a physical cell ID, a virtual cell ID, or an ID that is equivalent to the virtual cell ID is configured and is notified. For example, as IDs that are equivalent to the virtual cell ID, there are IDs (a PUSCH ID, a PUCCH ID, a scrambling initiation ID, a reference signal ID (RS ID), and the like) that can be configured in a physical channel-specific manner. The physical layer cell ID or the virtual cell ID is used for sequence generation of the physical channel or of physical signal.

The higher layer processing unit 101 generates control information for controlling the reception unit 105 and the transmission unit 107, based on uplink control information (UCI) that is notified on the physical uplink control channel (PUCCH) from the terminal device 2, and on a buffer condition that is notified from the terminal device 2 or various pieces of configuration information (a RRC message, system information, a parameter, and an information element) of each of the terminal devices 2 that are configured by the higher layer processing unit 101, and outputs the generated control information to the control unit 103. Moreover, the UCI includes at least one among the ACK/NACK, the scheduling request (SR), and the channel state information (CSI). Moreover, the CSI includes at least one among the CQI, the PMI, and the RI.

The higher layer processing unit 101 configures a transmit power for the uplink signal (the PRACH, the PUCCH, the PUSCH, the UL DMRS, the P-SRS, or the A-SRS) and a parameter relating to the transmit power. Furthermore, the higher layer processing unit 101 transmits a transmit power for the downlink signal (the CRS, the DL DMRS, the CSI-RS, the PDSCH, the PDCCH/EPDCCH, or the like) and a parameter relating to the transmit power to the terminal device 2 through the transmission unit 107. To be more precise, the higher layer processing unit 101 transmits the information relating to the uplink and downlink power control to the terminal device 2 through the transmission unit 107. In other words, the higher layer processing unit 101 generates information relating to the transmit power control for the base station apparatus 1 and the terminal device 2. For example, the higher layer processing unit 101 transmits the terminal device 2 of a parameter relating to the transmit power for the base station apparatus 1.

Furthermore, the higher layer processing unit 101 transmits the terminal device 2 of a parameter that is used for configuring a maximum transmit power $P_{CMAX,\,c}$ and a total maximum output power $P_{CMAX}$ of the terminal device 2. Furthermore, the higher layer processing unit 101 transmits the terminal device 2 of information relating to the transmit power control for various physical channels.

Furthermore, the higher layer processing unit 101 sets the transmit power for the terminal device 2, in such a manner that the PUSCH and the like satisfies prescribed channel quality according to information indicating an amount of interference from a neighbor base station apparatus, information indicating an amount of interference, which is notified from the neighbor base station apparatus and which is given to the base station apparatus 1, channel quality that is input from the channel measurement unit 109, or the like, or considering interference to the neighbor base station apparatus 1, and transmits information indicating these configurations to the terminal device 2 through the transmission unit 107.

Specifically, the higher layer processing unit 101 transmits nominal power ($P_{O\_NOMINAL\_PUSCH}$ or $P_{O\_NOMINAL\_PUCCH}$) for each of the PUSCH and the PUCCH, a channel loss compensation coefficient (attenuation coefficient) α, a power offset for the message 3, a power offset that is stipulated for every PUCCH format, and the like, as information (information on a common parameter relating to the uplink power control) that is shared among the terminal devices 2 or information that is configured as a parameter common to the terminal devices 2, with the system information. At this time, a power offset in a PUCCH format 3 and a power offset in a delta PUCCH format 1bCS may be notified additionally. Furthermore, pieces of information on these shared parameters may be notified with the RRC message.

Furthermore, the higher layer processing unit 101 notifies UE-specific PUSCH power $P_{O\_UE\_PUSCH}$, a parameter (deltaMCS-Enabled) indicating whether or not delta MCS is enabled, a parameter (accumulatedEnabled) indicating whether or not accumulation is enabled, UE-specific PUCCH power $P_{O\text{-}UE\text{-}PUCCH}$, a P-SRS power offset $P_{SRS\text{-}OFFSET}$ (0) and a filter coefficient, as information (information on a dedicated parameter relating to the uplink power control) that can be configured for every terminal device 2, with the RRC message. At this time, a power offset for transmit diversity in each PUCCH format and an A-SRS power offset $P_{SRS\_OFFSET}$ (1) may be notified. Moreover, α that is mentioned here is a coefficient that together with a path loss value is used for setting the transmit power and that indicates the extent to which a path loss is compensated for, in other words, a coefficient (an attenuation coefficient or a channel loss compensation coefficient) for determining to what extent the transmit power is increased or decreased according to the path loss (to be more precise, for determining to what extent the transmit power is adjusted). Normally, α is a value from 0 to 1. If α is 0, the adjustment of the power in accordance with the pass loss is not made. If α is 1, the transmit power for the terminal device 2 is adjusted in such a manner that the path loss does not have an effect on the base station apparatus 1. These pieces of information may be transmitted as re-configuration information to the terminal device 2. Moreover, each of the shared parameter and the dedicated parameter may be configured independently for the primary cell and the secondary cell, or for multiple serving cells.

Furthermore, in a case where functional information of the terminal device 2 is received in the reception unit 105 from the terminal device 2, the higher layer processing unit 101 performs various configurations based on the functional information of the terminal device 2. For example, based on the functional information of the terminal device 2, an uplink carrier frequency and a downlink carrier frequency are determined from a band (EUTRA operating band) that is supplied by the terminal device 2. Furthermore, whether or not MIMO communication with the terminal device 2 is performed is determined based on the functional information of the terminal device 2. Furthermore, whether or not the carrier aggregation is performed is determined based on the functional information of the terminal device 2. Furthermore, whether or not the carrier aggregation in different frame structure types is performed is determined based on the functional information of the terminal device 2. That is, various parameters that are used for whether or not the secondary cell is configured and for the secondary cell are determined. The determined information is notified to the terminal device 2. Moreover, information relating to the carrier frequency may be notified with the RRC message. That is, the information relating to the carrier frequency may be notified with the system information. Furthermore, the information relating to the carrier frequency may be the mobility control information. Furthermore, the information relating to the carrier frequency may be notified, as the RRC information, by the higher layer.

Furthermore, in a case where the secondary cell is configured for the terminal device 2, the higher layer processing unit 101 grants a cell index ("0" or an information bit that is equivalent to "0") other than a specific value to the secondary cell, and transmits that configuration information to the terminal device 2. In a case where the secondary cell is configured, the terminal device 2 regards the sell index of the primary cell as a specific value.

Furthermore, the higher layer processing unit 101 may configure a transmit power for the reference signal or for the downlink or uplink signal, or the parameter relating to the transmit power for every terminal device 2. Furthermore, the higher layer processing unit 101 may configure a transmit power for a common downlink or uplink signal, or the parameter relating to the transmit power between the terminal devices 2. The higher layer processing unit 101 may transmit pieces of information on these parameters to the terminal device 2, as the information (information on the parameter relating to the uplink power control) relating to the uplink power control and/or information (information on a parameter relating to downlink power control) relating to the downlink power control. At least one piece of parameter is transmitted to the terminal device 2 in a state of being included in the information on the parameter relating to the uplink power control and the information on the parameter relating to the downlink power control.

The higher layer processing unit 101 performs configurations of various IDs relating to various physical channels or physical signals, and outputs pieces of information relating to the configurations of the IDs to the reception unit 105 and the transmission unit 107 through the control unit 103. For example, the higher layer processing unit 101 configures a value of the RNTI (UE ID) at which the CRC that is included in the downlink control information format is scrambled.

Furthermore, the higher layer processing unit 101 may configure values of various identifiers, such as a cell radio network temporary identifier (C-RNTI), a temporary C-RNTI, a paging-RNTI (P-RNTI), a random access RNTI (RA-RNTI), a semi-persistent scheduling C-RNTI (SPS C-RNTI), and a system information RNTI (SI-RNTI).

Furthermore, the higher layer processing unit 101 configures a value of an ID such as a physical cell ID, a virtual cell ID, or a scramble initialization ID. These pieces of configuration information are output to each processing unit through the control unit 103. Furthermore, the pieces of configuration information may be transmitted, as the RRC message, the system information, the UE-specific dedicated information, and the information element, to the terminal device 2. Furthermore, some of the RNTIs may be transmitted using an MAC control element (CE).

The control unit 103 generates a control signal for performing the control of the reception unit 105 and the transmission unit 107 based on control information from the higher layer processing unit 101. The control unit 103 outputs the generated control signal to the reception unit 105 and the transmission unit 107 and performs the control of the reception unit 105 and the transmission unit 107.

In accordance with a control signal that is input from the control unit 103, the reception unit 105 outputs information, which results from demultiplexing, demodulating, and decoding a reception signal that is received from the terminal device 2 through the transmit and receive antenna 111, to the higher layer processing unit 101. The wireless reception unit 1057 converts (down-converts) an uplink signal received through the transmit and receive antenna 111 into an intermediate frequency (IF), removes an unnecessary frequency component, controls an amplification level in such a manner as to suitably maintain a signal level, performs orthogonal demodulation based on an in-phase component of and an orthogonal component of the received signal, and converts the resulting orthogonally-demodulated analog signal into a digital signal. Furthermore, the wireless reception unit 1057 removes a portion equivalent to a guard interval (GI) from the digital signal that results from the conversion. The wireless reception unit 1057 performs fast Fourier Transform (FFT) on the signal from which the guard interval is removed, extracts a signal in the frequency domain, and outputs the extracted signal to the demultiplexing unit 1055.

The demultiplexing unit 1055 demultiplexes the signal that is input from the wireless reception unit 1057 into signals such as the PUCCH, the PUSCH, the UL DMRS, and the SRS. Moreover, the demultiplexing is performed based on allocation information on a radio resource, which is determined in advance by the base station apparatus 1 and is notified to each terminal device 2. Furthermore, the demultiplexing unit 1055 makes an adjustment of channels, that is, the PUCCH and the PUSCH, from a channel estimate that is input from the channel measurement unit 109. Furthermore, the demultiplexing unit 1055 outputs the UL DMRS and the SRS, which results from the demultiplexing, to the channel measurement unit 109.

The demodulation unit 1053 performs Inverse Discrete Fourier Transform (IDFT) on the PUSCH, acquires a modulation symbol, and performs modulation of the received signal on each of the modulation symbols in the PUCCH and the PUSCH, using a modulation scheme that is prescribed in advance or that is notified by the base station apparatus 1 to each of the terminal devices 2 with the downlink control information, such as Binary Phase Shift Keying (BPSK), Quadrature Phase Shift Keying (QPSK), 16 Quadrature Amplitude Modulation (16 QAM), or 64 Quadrature Amplitude Modulation (64 QAM).

The decoding unit 1051 performs decoding on the demodulated coded bits in the PUCCH and the PUSCH at a coding rate in compliance with a coding scheme that is prescribed in advance, or at a coding rate that is prescribed in advance or is notified in advance by the base station apparatus 1 to the terminal device 2 with the uplink grant (UL grant), and outputs the decoded data information and the uplink control information to the higher layer processing unit 101.

The channel measurement unit 109 measures the channel estimate, the channel quality, and the like from the UL DMRS and the SRS, which are uplink demodulation reference signals that are input from the demultiplexing unit 1055, and outputs a result of the measurement to the demultiplexing unit 1055 and the higher layer processing unit 101. Furthermore, the channel measurement unit 109 measures a received power and/or reception quality of first to n-th signals, and outputs a result of the measurement to the demultiplexing unit 1055 and the higher layer processing unit 101.

The transmission unit 107 generates a reference signal for the downlink (a downlink reference signal) based on the control signal that is input from the control unit 103, codes and modulates the data information that is input from the higher layer processing unit 101 and the downlink control information, and multiplexes the PDCCH (EPDCCH), the PDSCH, and the downlink reference signal, and transmits a downlink signal to the terminal device 2 through the transmit and receive antenna 111.

The coding unit 1071 performs coding, such as turbo coding, convolutional coding, and block coding, on the downlink control information that is input from the higher layer processing unit 101, and the data information. The modulation unit 1073 performs modulation on the coded bits with the modulation schemes such as the QPSK, the 16 QAM, and the 64 QAM. The downlink reference signal generation unit 1079 generates as the downlink reference signal a sequence that is obtained according to a rule that is prescribed in advance based on a cell identifier (a cell ID, a cell identity, or a cell identification) and the like for identifying the base station apparatus 1 and that is already known to the terminal device 2. The multiplexing unit 1075 multiplexes each modulated channel and the generated downlink reference signal.

The wireless transmission unit 1077 performs the Inverse Fast Fourier Transform (IFFT) on a modulation symbol that results from the multiplexing, performs the modulation in compliance with an OFDM scheme, attaches the guard interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency, removes unnecessary frequency components, and performs power amplification, and outputs a final result to the transmit and receive antenna 111 for transmission.

Figure 2:
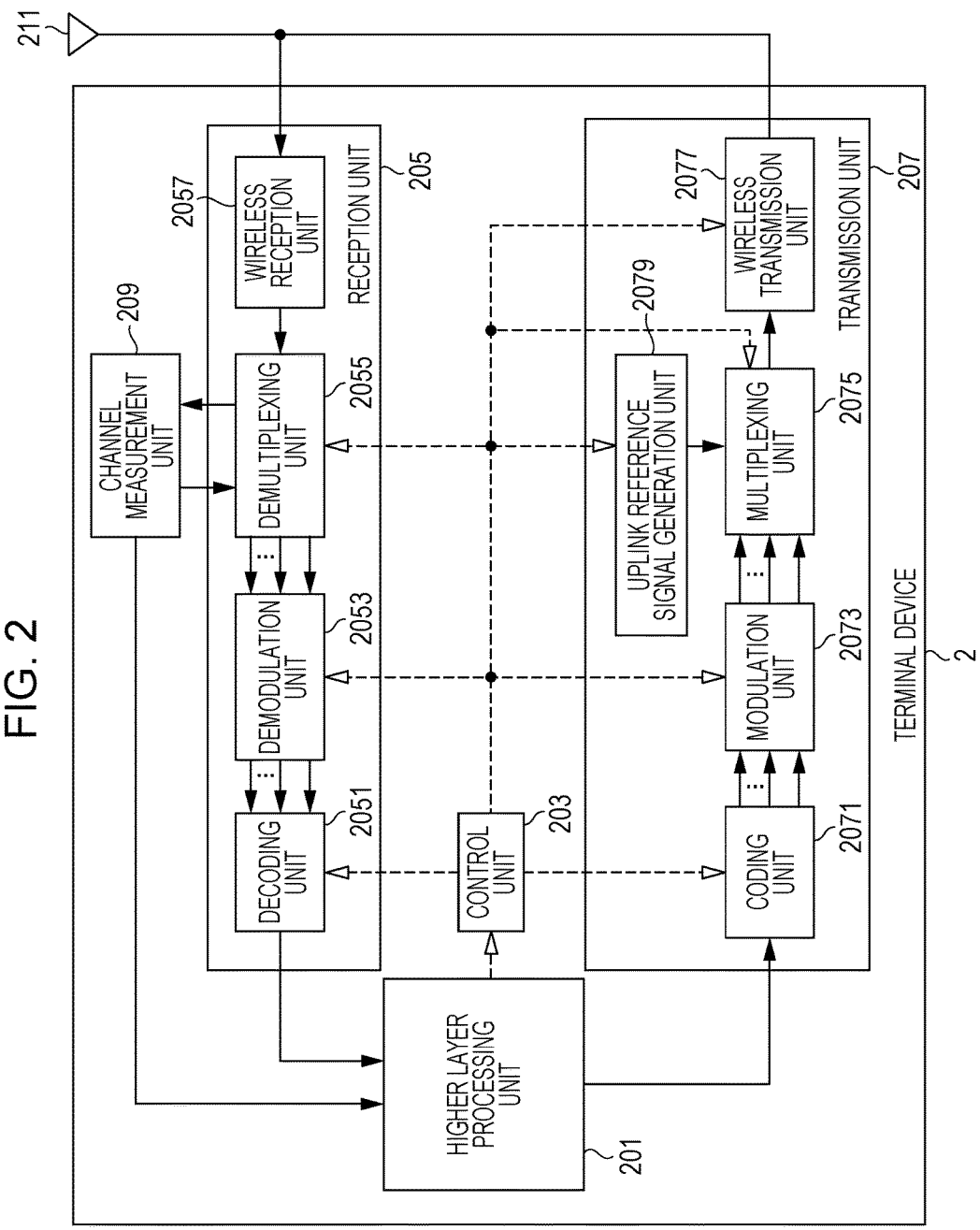
FIG. 2 is a schematic block diagram illustrating a configuration of a terminal device 2 according to the first embodiment of the present invention.

FIG. 2 is a schematic block diagram illustrating a configuration of the terminal device 2 according to the present embodiment. As illustrated, the terminal device 2 is configured to include a higher layer processing unit 201, a control unit 203, a reception unit 205, a transmission unit 207, a channel measurement unit 209, and a transmit and receive antenna 211. Furthermore, the reception unit 205 is configured to include a decoding unit 2051, a demodulation unit 2053, a demultiplexing unit 2055, and a wireless reception unit 2057. The reception processing by the terminal station device 2 is performed in the higher layer processing unit 201, the control unit 203, the reception unit 205 and the transmit and receive antenna 211. Furthermore, the transmission unit 207 is configured to include a coding unit 2071, a modulation unit 2073, a multiplexing unit 2075, and a wireless transmission unit 2077. Furthermore, the transmission processing by the terminal device 2 is performed in the higher layer processing unit 201, the control unit 203, the transmission unit 207, and the transmit and receive antenna 211.

The higher layer processing unit 201 outputs to a transmission unit the uplink data information that is generated by a user operation and the like. Furthermore, the higher layer processing unit 201 performs the processing of the medium access control (MAC) layer, the packet data convergence protocol (PDCP) layer, the radio link control (RLC) layer, and the radio resource control (RRC) layer.

The higher layer processing unit 201 manages various pieces of configuration information of the terminal device 2 itself. Furthermore, the higher layer processing unit 201 generates information that is arranged in each uplink channel and outputs the generated information to the transmission unit 207. The higher layer processing unit 201 generates the control information to perform the control of the reception unit 205 and of the transmission unit 207, based on various pieces of configuration information of the terminal device 2 itself, which is managed by the higher layer processing unit 201 for which the downlink control information that is notified from the base station apparatus 1 on the PDCCH and radio resource control information that is notified on the PDSCH are configured, and outputs the generated control information to the control unit 203. Furthermore, the higher layer processing unit 201 sets various parameters (an information element and an RRC message) of each signal, based on pieces of information relating to the first to n-th configurations relating to the first configuration, which are notified from the base station apparatus 1. Furthermore, these pieces of information that are set are generated and are output to the transmission unit 207 through the control unit 203. Furthermore, when a connection to the base station apparatus 1 is established, the higher layer processing unit 201 generates the functional information of the terminal device 2, and, through the control unit 203, outputs the generated functional information to the transmission unit 207 and notifies the base station apparatus 1 of the generated functional information. Furthermore, the higher layer processing unit 201 may establish the connection to the base station apparatus 1 and then may notify the base station apparatus 1 of the functional information.

Information (RF-parameters) relating to an RF parameter may be included in the functional information. Information (1st SupportedBandCombination) indicating the band that is supported by the terminal device 2 may be included in the information relating to the RF parameter. Information (SupportedBandCombinationExt) indicating a band that supports the carrier aggregation and/or MIMO may be included in the information relating to the RF parameter. Information (2nd SupportedBandCombination) indicating a band that supports the function of performing the transmission and reception at the same time between multiple timing advances or multiple bases, which are together put at the same time in the terminal device 2, may be included in the information relating to the RF parameter. Each of these bands may be listed up. A value (an entry) that is indicated by multiple listed pieces of information may be a common value (may be indicated as the same).

Whether or not each of the bands (bandE-UTRA, FreqBandIndicator, and E-UTRA Operating Band) that are supported by the terminal device 2 supports the half duplex may be indicated. The band for which the half duplex is not supported supports the full duplex.

Whether or not the band that is supported by the terminal device 2 supports the carrier aggregation and/or the MIMO with the uplink may be indicated.

Whether or not the band that is supported by the terminal device 2 supports the carrier aggregation and/or the MIMO with the downlink may be indicated.

Information indicating a band that supports TDD-FDD carrier aggregation may be included in the RF parameter. These bands may be listed.

Information indicating whether or not the function of performing the transmission and reception at the same time between the bands that supports the TDD-FDD carrier aggregation is supported may be included in the RF information.

Furthermore, information indicating whether or not the transmission and reception are performed at the same time between the bands in different duplex mode may be included in the information relating to the RF parameter.

In a case where a function that is not supported is present among these functions that are included in the functional information, the higher layer processing unit 201 may set information indicating whether or not such a function is supported, to be the functional information. The base station apparatus 1 regards the function that is not set to be the functional information, not as being supported by the terminal device 2, and performs various configurations for the function that is not set to be the functional information. Moreover, information indicating whether or not the function is supported may be information indicating that the function is supported.

If the function that is not supported, among these pieces of functional information, is present, the higher layer processing unit 201 may set a specific value (for example, "0") or information (for example, "not supported", "disable", "FALSE" and or the like), which indicates that the function is not supported, for that function, and may notify the base station apparatus 1 of the functional information including that function.

If the function that is supported, among these pieces of functional information, is present, the higher layer processing unit 201 may set a specific value (for example, "1") or information (for example, "supported", "enabled", "TRUE" and or the like), which indicates that the function is supported, for that function, and may notify the base station apparatus 1 of the functional information including that function.

In a case where the function of performing the transmission and reception at the same time between the bands that are aggregated at the same time is not present, the higher layer processing unit 201 sets a specific value or information, which indicates that the function is not supported, for information (simultaneousRx-Tx) indicating whether or not the function of performing the transmission and reception at the same time between the bands that are able to be aggregated at the same time. Furthermore, the information itself indicating whether or not the function of performing the transmission and reception at the same time between the bands that are able to be aggregated at the same time is supported may not be set to be in the functional information.

The higher layer processing unit 201 acquires from the reception unit 205 information indicating a sounding subframe (an SRS subframe or an SRS transmission subframe) that is a subframe for which to reserve a radio resource for transmitting the SRS that is broadcast by the base station apparatus 1, and a bandwidth of the radio resource that is reserved to transmit the SRS within the sounding subframe, information indicating a subframe on which to transmit a periodic SRS that is notified by the base station apparatus 1 to the terminal device 2, a frequency band, and an amount of cyclic shift that is used in a CAZAC sequence for the periodic SRS, and information indicating the frequency band in which to transmit an aperiodic SRS that is notified by the base station apparatus 1 to the terminal device 2, and the amount of cyclic shift that is used in a CAZAC sequence for the aperiodic SRS.

The higher layer processing unit 201 performs control of SRS transmission in accordance with the information described above. Specifically, the higher layer processing unit 201 controls the transmission unit 207 in such a manner that, in accordance with information relating to the periodic SRS described above, the periodic SRS is transmitted one time or periodically. Furthermore, in a case where, in the SRS request (the SRS indicator) that is input from the reception unit 205, transmission of the aperiodic SRS is requested, the higher layer processing unit 201 transmits the aperiodic SRS only the number of times (for example, one time) that is prescribed in advance, in accordance with information relating to the aperiodic SRS.

Furthermore, the higher layer processing unit 201 performs the control of the transmit power for the PRACH, the PUCCH, the PUSCH, the periodic SRS, and the aperiodic SRS, based on information relating to the control of the transmit power for various uplink signals that are transmitted from the base station apparatus 1. Specifically, the higher layer processing unit 201 configures the transmit power for the various uplink signals based on various pieces of information relating to the uplink power control, which are acquired from the reception unit 205. For example, the transmit power for the SRS is controlled based on $P_{O\_PUSCH}$, $\alpha$, a power offset $P_{SRS\_OFFSET}$ (0) (a first power offset (pSRS-Offset)) for the periodic SRS, a power offset $P_{SRS\_OFFSET}$ (1) (a second power offset (pSRS-OffsetAp)) for the aperiodic SRS, and a TPC command. Moreover, the higher layer processing unit 201 causes $P_{SRS\_OFFSET}$ to switch between the first power offset and the second power offset according to whether the SRS is the periodic SRS or the aperiodic SRS.

Furthermore, in a case where a third power offset is configured for the periodic SRS and/or the aperiodic SRS, the higher layer processing unit 201 sets the transmit power based on the third power offset. Moreover, a value of the third power offset may be configured to be in a wider range than that of the first power offset or the second power offset. The third power offset may be configured for each of the periodic SRS and the aperiodic SRS. To be more precise, the information on the parameter relating to the uplink power control is an information element or an RRC message in which a parameter relating to the control of the transmit power for various uplink physical channels is included.

Furthermore, in a case where, in a certain serving cell and a certain subframe, a sum of a transmit power for the first uplink reference signal and a transmit power for the physical uplink shared channel exceeds the total maximum transmit power (for example, $P_{CMAX}$ or $P_{CMAX,\ c}$) that is configured for the terminal device 2, the higher layer processing unit 201 outputs indication information to the transmission unit 207 through the control unit 203, in such a manner that the physical uplink shared channel is transmitted.

Furthermore, in a case where, in a certain serving cell and a certain subframe, a sum of the transmit power for the first uplink reference signal and a transmit power for the physical uplink control channel exceeds the total maximum transmit power (for example, $P_{CMAX}$ or $P_{CMAX,\ c}$) that is configured for the terminal device 2, the higher layer processing unit 201 outputs the indication information to the transmission unit 207 through the control unit 203, in such a manner that the physical uplink control channel is transmitted.

Furthermore, in a case where, in a certain serving cell and a certain subframe, a sum of a transmit power for the second uplink reference signal and the transmit power for the physical uplink shared channel exceeds the total maximum transmit power that is configured for the terminal device 2, the higher layer processing unit 201 outputs the indication information to the transmission unit 207 through the control unit 203, in such a manner that the physical uplink shared channel is transmitted.

Furthermore, in a case where, in a certain serving cell (for example, a serving cell c) and a certain subframe (for example, a subframe i), a sum of the transmit power for the second uplink reference signal and the transmit power for the physical uplink control channel exceeds the total maximum transmit power that is configured for the terminal device 2, the higher layer processing unit 201 outputs the indication information to the transmission unit 207 through the control unit 203, in such a manner that the physical uplink control channel is transmitted.

Furthermore, in a case where multiple physical channels are transmitted at the same timing (for example, on a subframe), the higher layer processing unit 201 can control the transmit power for the various physical channels or control the transmissions of the various physical channels according to priority levels of various physical channels. The higher layer processing unit 201 outputs the control information to the transmission unit 207 through the control unit 203.

Furthermore, in a case where carrier aggregation that uses multiple component carriers which correspond to multiple serving cells or each of the multiple serving cells is performed, the higher layer processing unit 201 can control the transmit power for the various physical channel or can control the transmit of the various physical channels according to the priority levels of the physical channels.

Furthermore, the higher layer processing unit 201 may perform the transmit control of the various physical channels that are transmitted from a cell, according to a priority level of the cell. The higher layer processing unit 201 outputs the control information to the transmission unit 207 through the control unit 203.

The higher layer processing unit 201 outputs the indication information to the transmission unit 207 through the control unit 203 in such a manner that the generation of the uplink reference signal and so forth are performed based on information relating to a configuration of the uplink reference signal, which is notified from the base station apparatus 1. To be more precise, a reference signal control unit 2013 outputs the information relating to the configuration of the uplink reference signal to an uplink reference signal generation unit 2079 through the control unit 203.

The control unit 203 generates a control signal for performing the control of the reception unit 205 and the transmission unit 207 based on control information from the higher layer processing unit 201. The control unit 203 outputs the generated control signal to the reception unit 205 and the transmission unit 207, and performs the control of the reception unit 205 and of the transmission unit 207.

In accordance with a control signal that is input from the control unit 203, the reception unit 205 demultiplexes, demodulates, and decodes a reception signal that is received from the base station apparatus 1 through the transmit and receive antenna 211, and outputs the resulting information to the higher layer processing unit 201.

The reception unit 205 performs suitable reception processing according to whether or not the information relating to the first configuration and/or information relating to the second configuration are received. For example, in a case where either of the information relating to the first configuration and the information relating to the second control information is received, a first control information field is detected from the received downlink control information format. In a case where the information relating to the first configuration and the information relating to the second control information are received, a second control information field is detected from the received downlink control information format.

The wireless reception unit 2057 converts (down-converts) a downlink signal that is received through each receive antenna into an intermediate frequency, removes an unnecessary frequency component, controls an amplification level in such a manner that a signal level is suitably maintained, performs orthogonal demodulation based on an in-phase component of and an orthogonal component of the received signal, and converts the resulting orthogonally-demodulated analog signal into a digital signal. The wireless reception unit 2057 removes a portion equivalent to the guard interval from the digital signal that results from the conversion, performs the Fast Fourier Transform on the signal from which the guard interval is removed, and extracts a signal in the frequency domain.

The demultiplexing unit 2055 demultiplexes the extracted signal into the PDCCH, the PDSCH, and the downlink reference signal (DL-RS). Moreover, the demultiplexing is performed based on the allocation information on the radio resource and the like that are notified with the downlink control information. Furthermore, the demultiplexing unit 2055 makes an adjustment of channels, that is, the PDCCH and the PDSCH, from a channel estimate that is input from the channel measurement unit 209. Furthermore, the demultiplexing unit 2055 outputs the downlink reference signal, which results from the demultiplexing, to the channel measurement unit 209.

The demodulation unit 2053 performs demodulation in compliance with a QPSK modulation scheme on the PDCCH and outputs a result of the demodulation to the decoding unit 2051. In a case where the decoding unit 2051 attempts to decode the PDCCH and succeeds in the decoding, the decoding unit 2051 outputs the downlink control information that results from the decoding, to the higher layer processing unit 201. The demodulation unit 2053 performs the demodulation, which is in compliance with the modulation scheme that is notified with the downlink control information, such as the QPSK, the 16 QAM, and the 64 QAM, on the PDSCH, and outputs a result of the demodulation to the decoding unit 2051. The decoding unit 2051 performs the decoding on a coding rate that is notified with the downlink control information, and outputs the data information that results from the decoding, to the higher layer processing unit 201.

The channel measurement unit 209 measures a downlink path loss from the downlink reference that is input from the demultiplexing unit 2055, and outputs the measured path loss to the higher layer processing unit 201. Furthermore, the channel measurement unit 209 calculates a downlink channel estimate from the downlink reference signal and outputs the calculated downlink channel estimate to the demultiplexing unit 2055. Furthermore, the channel measurement unit 209 performs received power measurement or reception quality measurement of the first signal and/or the second signal in accordance with various pieces of information relating to measurement, which is notified from the reference signal control unit 2013 through the control unit 203, or various pieces of information relating to a measurement report. A result of the measurement is output to the higher layer processing unit 201. Furthermore, in a case where the channel measurement unit 209 is instructed to perform the channel estimation of the first signal and/or the second signal, the channel measurement unit 209 may output a result relating to the channel estimation of each signal to the higher layer processing unit 201. At this point, the first signal or the second signal is a reference signal (a pilot signal, a pilot channel, or a reference signal), and in addition to the first signal or the second signal, a third signal or a fourth signal may be provided. To be more precise, the channel measurement unit 209 measures channels for one or more signals. Furthermore, the channel measurement unit 209 measures a signal for performing the channel measurement in accordance with the control information that is notified from the higher layer processing unit 201 through the control unit 203.

Furthermore, in a case where in a certain cell (the first cell), the uplink subframe on which the uplink transmission is requested takes place and thus the CRS or the CSI-RS cannot be measured with the same subframe in a different cell (the second cell) that is different from the certain cell, the channel measurement unit 209 may perform the measurement except for a subframe on which an average of the results (the received power, the reception quality, or the channel quality) of the measurements in the second cell cannot be measured. In other words, the channel measurement unit 209 may calculate an average value of the results (the received power, the reception quality, or the channel quality) of the measurement using only the received CRS or CSI-RS. The result (an indicator or information that corresponds to the result of the calculation) of the calculation may be transmitted to the base station apparatus 1 through the transmission unit 207.

Based on the control signal (the control information) that is input from the control unit 203, the transmission unit 207 generates the uplink demodulation reference signal (UL DMRS) and/or the sounding reference signal (SRS), codes and modulates the data information that is input from the higher layer processing unit 201, multiplexes the PUCCH, the PUSCH, and the generated UL DMRS and/or SRS, adjusts the transmit power for the PUCCH, the PUSCH, the UL DMRS, and the SRS, and transmits a result of the multiplexing to the base station apparatus 1 through the transmit and receive antenna 211.

Furthermore, in a case where information relating to the result of the measurement is output from the higher layer processing unit 201, the transmission unit 207 transmits the information that is output, to the base station apparatus 1 through the transmit and receive antenna 211.

Furthermore, in a case where the channel state information that is the result relating to the channel estimation is output from the higher layer processing unit 201, the transmission unit 207 feeds the channel state information back to the base station apparatus 1. To be more precise, the higher layer processing unit 201 generates the channel state information (the CSI, the CQI, the PMI, or the RI) based on the result of the measurement, which is notified from the channel measurement unit 209, and feeds the generated channel state information back to the base station apparatus 1 through the control unit 203.

When a prescribed grant (or a prescribed downlink control information format) is detected in the reception unit 205, the transmission unit 207 transmits the uplink signal that corresponds to the prescribed grant, on an uplink subframe that first appears after a prescribed subframe passes from a subframe from which the grant is detected. For example, when the grant is detected in the subframe i, the uplink signal can be transmitted on the uplink subframe that first appears after a subframe i+k.

Furthermore, in a case where a transmission subframe for the uplink signal is the subframe i, the transmission unit 207 sets the transmit power for the uplink signal based on a power control adjustment value that is obtained by the TPC command which is received on a subframe i−k. At this point, a power control adjustment value f(i) (or g(i)) is configured based on a correction value or an absolute value that is associated with a value which is set for the TPC command. In a case where the accumulation is enabled, the correction values that are associated with the value which is set for the TPC command are accumulated, and a result of the accumulation is applied as the power control adjustment value. In a case where the accumulation is enabled, the absolute value that is associated with the value which is set for a single TPC command is applied as the power control adjustment value.

In a case where either of the information relating to the first configuration and the information relating to the second configuration is received in the reception unit 205, the transmission unit 207 sets the transmit power based on the parameter relating to the first uplink power control and transmits the uplink signal. In a case where the information relating to the first configuration and the information relating to the second configuration are received in the reception unit 205, the transmission unit 207 sets the transmit power based on the parameter relating to the second uplink power control, and transmits the uplink signal.

The coding unit 2071 performs the coding, such as the turbo coding, the convolutional coding, and the block coding, on the uplink control information that is input from the higher layer processing unit 201 and on the data information. The modulation unit 2073 modulates the coded bits, which are input from the coding unit 2071, with the modulation scheme such as the BPSK, the QPSK, the 16 QAM, or the 64 QAM.

The uplink reference signal generation unit 2079 generates the uplink reference signal based on the information on the configuration of the uplink reference signal. To be more precise, the uplink reference signal generation unit 2079 generates the known CAZAC sequence that is obtained according to the rule which is prescribed in advance based on the cell identifier for identifying the base station apparatus 1, the bandwidth to which the uplink demodulation reference signal, the first uplink reference signal, and the second uplink reference signal are mapped, and the like, and that is already known to the base station apparatus 1. Furthermore, based on the control signal that is input from the control unit 203, the uplink reference signal generation unit 2079 grants the cyclic shift to the CAZAC sequences for the uplink demodulation reference signal, the first uplink reference signal, and the second uplink reference signal that are generated.

The uplink reference signal generation unit 2079 may initialize reference sequences for the uplink demodulation reference signal, the sounding reference signal, and/or the uplink reference signal, based on a prescribed parameter. The prescribed parameters may be the same in each reference signal. Furthermore, a prescribed parameter may be a parameter that is configured independently for each reference signal. To be more precise, if a parameter that is independently configured is not present, the uplink reference signal generation unit 2079 can initialize a reference sequence for each reference signal with the same parameter.

Based on the control signal that is input from the control unit 203, the multiplexing unit 2075 re-allocates PUSCH modulation symbols in parallel and then performs the Discrete Fourier Transform (DFT) on the reallocated PUSCH modulation symbols, and multiplexes PUCCH and PUSCH signals and the generated UL DMRS and SRS.

The wireless transmission unit 2077 performs the Inverse Fast Fourier Transform on a signal that results from the multiplexing, performs the modulation in compliance with an SC-FDMA scheme, attaches the guard interval to an SC-FDMA symbol that results from performing the SC-FDMA modulation, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency (radio frequency), removes unnecessary frequency components, performs power amplification, and outputs a final result to the transmit and receive antenna 211 for transmission.

Moreover, according to each of the embodiments described above, the reception processing may include detection processing (detection). Furthermore, the reception processing may include demodulation processing (demodulation). Furthermore, the reception processing may include decoding processing (decode or decoding).

Moreover, the terminal device 2 may configure or in advance define priority levels of the physical channel/physical signal that are transmitted according to a type of physical channel.

Moreover, according to each of the embodiment described above, the terminal device 2 may report to the base station apparatus 1 the result of the measurement of the received power that is based on the CSI-RS or a discovery reference signal (DRS). The terminal device 2 may make the report periodically. Furthermore, the terminal device 2 may make the report in a case where a certain condition is satisfied.

According to each of the embodiment described above, in a case where the received power that is based on the CSI-RS or the DRS is measured, the terminal device 2 may perform the control of the transmit power for the uplink signal based on the received power. Furthermore, the terminal device 2 may determine the downlink path loss based on the received power.

Moreover, according to each of the embodiments described above, in a case where a sum of transmit powers for various uplink signals, which include the transmit powers for the first uplink reference signal and/or the second uplink reference signal, exceeds a maximum transmit power that is configured for the terminal device 2, the terminal device 2 may not transmit the first uplink reference signal and/or the second uplink reference signal.

Moreover, according to each of the embodiments described above, when a certain condition is satisfied, the base station apparatus 1 and the terminal device 2 may set one of the information relating to the first configuration and the information relating to the second configuration as the uplink reference UL-DL configuration, and may set the other as the downlink reference UL-DL configuration. For example, the terminal device 2 may receive two configurations, that is, the information relating to the first configuration and the information relating to the second configuration, and then may configure the two configurations for the uplink reference UL-DL configuration and the downlink reference UL-DL configuration. Moreover, the DCI format (for example, the DCI format 0/4) relating to the uplink may be transmitted on the downlink subframe that is configured with the uplink reference UL-DL configuration.

Furthermore, the uplink reference UL-DL configuration and the downlink reference UL-DL configuration each may be set using the same table. However, in a case where indexes for the uplink reference UL-DL configuration and the downlink reference UL-DL configuration are configured based on the same table, it is preferable that the uplink reference UL-DL configuration and the downlink reference UL-DL configuration are set with different indexes. To be more precise, it is preferable that the uplink reference UL-DL configuration and the downlink reference UL-DL configuration are set with different subframe patterns.

In a case where multiple TDD UL/DL configurations are indicated for one serving cell (the primary cell or the secondary cell), depending on a condition, one may be set as the uplink reference UL-DL configuration and another one may be set as the downlink reference UL-DL configuration. Moreover, the uplink reference UL-DL configuration may be used to determine a correspondence between a subframe to which at least the physical downlink control channel is allocated and a subframe to which the physical uplink shared channel to which the physical downlink control channel described above corresponds is allocated, and although a direction (to be more precise, the uplink or the downlink) in which a signal is actually transmitted is different, this does not matter. The downlink reference UL-DL configuration may be used to determine a correspondence between a subframe to which at least the physical downlink shared channel is allocated and a subframe on which the HARQ-ACK corresponding to the physical downlink shared channel described above is transmitted, and although the direction (to be more precise, the uplink or the downlink) in which the signal is actually transmitted is different, this does not matter. That is, the uplink reference UL-DL configuration is used to specify (select or determine) a correspondence between a subframe n to which the PDCCH/EPDCCH/PHICH is allocated and a subframe n+k to which the PUSCH to which the PDCCH/EPDCCH/PHICH described above corresponds is allocated. In a case where one primary cell is configured, or in a case where one primary cell and one secondary cell are configured and the uplink reference UL-DL configuration that corresponds to the primary cell and the uplink reference UL-DL configuration that corresponds to the secondary cell are the same, in each of the two serving cells, the corresponding uplink reference UL-DL configuration is used to determine a correspondence between a subframe to which the PDCCH/EPDCCH/PHICH is allocated and a subframe to which the PUSCH to which the PDCCH/EPDCCH/PHICH described above corresponds is allocated. Furthermore, the downlink reference UL-DL configuration is used to specify (select or determine) a correspondence between a subframe n to which the PDSCH is allocated and a subframe n+k on which the HARQ-ACK corresponding to the PDSCH described above is transmitted. In the case where one primary cell is configured, or in a case where one primary cell and one secondary cell are configured and the downlink reference UL-DL configuration that corresponds to the primary cell and the downlink reference UL-DL configuration that corresponds to the secondary cell are the same, in each of the two serving cells, the corresponding downlink reference UL-DL configuration is used to specify (select or determine) a correspondence between the subframe n to which the PDSCH is allocated and the subframe n+k on which the HARQ-ACK corresponding to the PDSCH described above is transmitted.

Furthermore, when, for the terminal device 2, a TDD UL/DL configuration (a first TDD UL/DL configuration) for an uplink transmission reference and a TDD UL/DL configuration (the second TDD UL/DL configuration) for a downlink transmission reference are set and the information relating to the uplink transmit power control is configured, in a case where, for the terminal device 2, the same type of subframe is configured with the first TDD UL/DL configuration and the second TDD UL/DL configuration, the uplink power control for the subframe is set based on the parameter relating to the first power control. Furthermore, in a case where, for the terminal device 2, different types of subframes are configured with the first TDD UL/DL configuration and the second TDD UL/DL configuration, the uplink power for the subframe is set based on the parameter relating to the second power control.

Moreover, the flexible subframe is a subframe that is an uplink subframe and is a downlink subframe. Furthermore, the flexible subframe is a subframe that is a downlink subframe and is a special subframe. Furthermore, the flexible subframe is a subframe that is an uplink subframe and is a special subframe. To be more precise, the flexible subframe is a subframe that is the first subframe and is the second subframe. For example, furthermore, a subframe that is configured as the flexible subframe is processed as the first subframe (for example, the uplink subframe) in the case of condition 1, and is processed as the second subframe (for example, the downlink subframe) in the case of condition 2.

Moreover, the flexible subframe may be set based on the first configuration and the second configuration. For example, in a case where a certain subframe i is configured as the uplink subframe with the first configuration and is configured as the downlink subframe with the second configuration, the subframe i is the special subframe. The flexible subframe may be configured based on information indicating a subframe pattern of the flexible subframe.

Furthermore, multiple subframe sets may be configured based on one TDD UL/DL configuration and a flexible subframe pattern (a downlink candidate subframe pattern, an uplink candidate subframe pattern, or an additional subframe), not with two TDD UL/DL configurations. In a subframe index that is indicated with the flexible subframe pattern, although it is indicated with the TDD UL/DL configuration that the uplink subframe is present, if the uplink signal is not transmitted on that subframe, the terminal device 2 can receive the downlink signal. Furthermore, although it is indicated with the TDD UL/DL configuration that the downlink subframe is present, if it is indicated in advance that the uplink signal is transmitted on the subframe, the terminal device 2 can transmit the uplink signal. A specific subframe may be indicated as a subframe for an uplink/downlink candidate.

When a certain condition is satisfied, the terminal device 2 may recognize one of the subframe sets as a subframe set for the uplink and may recognize the other as a subframe set for the downlink. At this point, the subframe set for the uplink is a set of subframes that are configured for the transmission of the PUSCH and transmission of the PHICH, and the subframe set for the downlink is a set of subframes that are configured for transmission of the PDSCH and transmission of the HARQ. Information indicating a subframe relationship between the PUSCH and the PHICH and information indicating a subframe relationship between the PDSCH and the HARQ may be configured in advance for the terminal device 2.

Moreover, according to each of the embodiments described above, multiple subframe sets may be configured for one serving cell (the primary cell, the secondary cell, the carrier frequency, the transmission frequency, or the component carrier). There may be a cell for which multiple subframe sets are configured and a cell for which multiple subframe sets are not configured.

Moreover, according to each of the embodiments described above, in a case where two or more subframe sets are configured independently for one serving cell, the maximum transmit power ($P_{CMAX}$, $P_{CMAX, c}$) that is configured for every terminal device 2 may be configured for each of the subframe sets. To be more precise, the terminal device 2 may configure multiple maximum transmit powers independently.

To be more precise, multiple maximum transmit powers ($P_{CMAX}$, $P_{CMAX, c}$) may set for one serving cell. Furthermore, multiple maximum allowed output power ($P_{EMAX, c}$) may be configured for one serving cell.

Furthermore, in a case where resource allocation for various uplink signals is the same, the base station apparatus 1 can detect the various uplink signals using a difference in a signal sequence between the uplink signals. To be more precise, the base station apparatus 1 can identify each of the uplink signals using the difference in the signal sequence between the received uplink signals. Furthermore, the base station apparatus 1 can determine whether or not the transmission is destined for the base station apparatus 1 itself, using the difference in the signal sequence between the received uplink signals.

Moreover, in a case where the base station apparatus 1 instructs the terminal device 2 to measure the received power with the CSI-RS or the DRS, the terminal device 2 may calculate the downlink path loss based on a result of the measurement and may use the calculated downlink path loss for the uplink transmit power control.

In some cases, the received power measurement here is referred to as reference signal received power (RSRP) measurement or reception signal power measurement. Furthermore, in some cases, the reception quality measurement is referred to as reference signal received quality (RSRQ) measurement or reception signal quality measurement.

Furthermore, the resource allocation (mapping to resource elements or mapping to physical resources) to the CSI-RS and the DRS may be frequency-shifted. The frequency shift of the CSI-RS or the DRS may be determined based on the physical cell ID. Furthermore, the frequency shift of the CSI-RS or the DRS may be determined based on the virtual cell ID.

For example, if the base station apparatus 1 does not notify the terminal device 2 of information, the terminal device 2 performs the received power measurement of a first downlink reference signal. The base station apparatus 1 notifies the terminal device 2 of information indicating whether or not received power measurement of a second downlink reference signal is performed. In a case where the indication information indicates that the received power measurement of the second downlink reference signal can be performed, the terminal device 2 performs the received power measurement of the second downlink reference signal. At this time, the terminal device 2 may perform the received power measurement of the first downlink reference signal in a parallel manner. In a case where the indication information indicates that the received power measurement of the second downlink reference signal cannot be performed, the terminal device 2 performs the received power measurement of only the first downlink reference signal. Moreover, information indicating whether or not the received quality measurement of the second downlink reference signal is performed may be included in the indication information. Furthermore, the received power measurement of a third downlink reference signal may be performed without depending on the indication information.

In a case where two subframe sets are configured for one serving cells, when it is assumed that the second subframe set is the subframe pattern of the flexible subframe, information indicating a pattern of a subframe on which the DCI format including the TPC command field for the flexible subframe is able to be received may be transmitted from the base station apparatus 1 to the terminal device 2.

Each of the pattern of the subframe on which the TPC command that is applicable to the uplink subframe which belongs to the first subframe set is transmitted and the pattern of the subframe on which the TPC command that is applicable to the uplink subframe which belongs to the second subframe set is transmitted may be configured separately. An association (linkage) between an uplink subframe and a downlink subframe on which the DCI format that includes the TPC command for the uplink subframe is transmitted may be managed using a table.

Furthermore, the result of RSRP measurement may be independent with the subframe set. The measurement of the RSRP by the CRS that is received on the downlink subframe that is a fixed subframe and of the RSRP by the CRS that is received on the flexible subframe may be performed independently.

Moreover, according to each of the embodiments described above, the resource element or the resource block is described as being used as a mapping unit for various uplink signals or downlink signals and the symbol, the subframe, or the radio frame is described as being used as a communication unit for the time direction, but no limitation to this is imposed. Even if, instead of these, domain and time units are used that are constituted from an arbitrary frequency and time, respectively, the same effect can be obtained. Moreover, according to each of the embodiments described above, the case where the demodulation is performed using the RS that is processed in a precoded manner is described, and for description, a port that is equivalent to a MIMO layer is used as a port corresponding to the RS that is processed in a precoded manner, but no limitation to this is imposed. In addition, the same effect can be obtained by applying the present invention to ports that correspond to different reference signals, respectively. For example, unprecoded (non-precoded) RS can be used instead of precoded RS, and, as the port, a port that is equivalent to an output terminal after the precoding processing, or a port that is equivalent to a physical antenna (or a combination of antennas) can be used.

Moreover, according to each of the embodiment described above, in a case where only the DCI format 3/3A is received on a certain downlink subframe, the correction value (or the absolute value) that corresponds to a value that is set to be in the TPC command field which is included in the DCI format 3/3A is applied to the power control adjustment value for the transmit power for the PUSCH that is transmitted on a specific subframe set, without depending on which subframe set the downlink subframe belongs to. In a case where only the DCI format 3/3A is received on a certain downlink subframe, the accumulation of the TPC command that is included in the DCI format 3/3A may be applied to the power control adjustment value that is used for the transmit power for the PUSCH which is transmitted on a specific subframe set. Moreover, the specific subframe set may be a set of fixed subframes, may be a set of flexible subframes, and may be a set of arbitrary subframes.

Moreover, according to each of the embodiments described above, the parameter relating to the uplink power control is a parameter that is used for the transmit power control for the uplink physical channel/physical signal (the PUSCH, the PUCCH, the PRACH, the SRS, the DMRS, or the like), and the parameters that are used for the transmit power control includes information that relates to the switching between or (re-)setting of various parameters that are used for the configuration of the transmit power for various uplink physical channels. Furthermore, a parameter relating to the downlink transmit power control is a parameter that is used for the transmit power control for the downlink physical channel/physical signal (the CRS, the UERS (DL DMRS), the CSI-RS, the PDSCH, the PDCCH/EPDCCH, the PBCH, the PSS/SSS, the PMCH, the PRS, or the like), and the parameters that are used for the transmit power control include information that relates to the switching between or (re-)setting of various parameters that are used for the configuration of the transmit power for various downlink physical channels.

Moreover, according to each of the embodiments described above, the base station apparatus 1 may be able to configure multiple virtual cell IDs for one terminal device 2. For example, the base station apparatus 1 and a network that include at least one base station apparatus 1 may be able to configure the virtual cell ID independently for every physical channel/physical signal. Furthermore, multiple virtual cell IDs may be able to be configured for one physical channel/physical signal. To be more precise, the virtual cell ID may be allowed to be able to be set each time each of the physical channel/physical signal is configured. Furthermore, with the multiple physical channels/physical signals, the virtual cell ID may be shared.

Moreover, according to each of the embodiments described above, for example, the setting of the power includes setting a power value, the setting of the power includes setting a value for a parameter relating to the power, the calculating of the power includes calculating the power value, the measuring of the power includes measuring the power value, and the reporting of the power includes reporting the power value. In this manner, the term power includes the meaning of a suitable power value as well.

Moreover, as described according to each of the embodiments, the non-performing of the transmission includes not performing the transmission processing. Furthermore, the non-performing of the transmission includes not performing signal generation for the transmission. Furthermore, the non-performing of the transmission includes generating a signal (or information) without transmitting the signal (or the information) it. Furthermore, the non-performing of the reception includes not performing the reception processing. Furthermore, the non-performing of the reception includes not performing the detection processing. Furthermore, the non-performing of the reception includes not performing the decoding/demodulation processing.

Moreover, according to each of the embodiments described above, for example, the calculating of the path loss includes calculating a value of the path loss. In this manner, the term path loss includes the meaning of a value of a suitable path loss as well.

Moreover, according to each of the embodiments described above, the configuring of various parameters includes configuring of various values of various parameters. In this manner, the expression various parameter includes the meaning of values of various suitable parameters as well.

A program running on the base station apparatus 1 and the terminal device 2 according to the present invention is a program (a program that causes a computer to operate) that controls a CPU and the like in such a manner as to realize the functions according to the embodiments of the present invention. Then, pieces of information that are handled in the apparatus and the device are temporarily accumulated in a RAM while being processed. Thereafter, the pieces of information are stored in various ROMs or HDDs, and whenever necessary, is read by the CPU to be modified or written. As a recording medium on which to store the program, among a semiconductor medium (for example, a ROM, a nonvolatile memory card, or the like), an optical storage medium (for example, a DVD, an MO, an MD, a CD, a BD, or the like), a magnetic storage medium (for example, a magnetic tape, a flexible disk, or the like), and the like, any one may be possible. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where the programs are distributed on the market, the programs, each of which is stored on a portable recording medium, can be distributed, or can be transmitted to a server computer that is connected through a network such as the Internet. In this case, a storage device of the server computer is also included in the present invention. Furthermore, some or all portions of the base station apparatus 1 and the terminal device 2 according to the embodiments described above may be realized as an LSI that is a typical integrated circuit. Each functional block of the base station apparatus 1 and the terminal device 2 may be individually built into a chip, and some or all functional blocks may be integrated into a chip. Furthermore, a technique for the integrated circuit is not limited to an LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

The embodiments of the invention are described in detail above referring to the drawings, but the specific configuration is not limited to the embodiments and includes an amendment to a design and the like that fall within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which a constituent element that achieves the same effect is substituted for the one that is described according to each of the embodiments described above is also included in the technical scope of the present invention.

Moreover, the invention in the present application is not limited to the embodiments described above. Furthermore, application of the terminal device according to the invention in the present application is not limited to the mobile station. It goes without saying that the terminal device can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, office equipment, a vending machine, and other household apparatuses. Furthermore, the present invention is suitable for use in a wireless base station apparatus, a wireless terminal device, a wireless communication system, or a wireless communication method.

INDUSTRIAL APPLICABILITY

The present invention can be applied to a mobile phone, a personal computer, a tablet computer, and the like.

REFERENCE SIGNS LIST

1 BASE STATION APPARATUS
2 TERMINAL DEVICE
101 HIGHER LAYER PROCESSING UNIT
103 CONTROL UNIT
105 RECEPTION UNIT
107 TRANSMISSION UNIT
109 CHANNEL ESTIMATION UNIT
111 TRANSMIT AND RECEIVE ANTENNA
1051 DECODING UNIT
1053 DEMODULATION UNIT
1055 DEMULTIPLEXING UNIT
1057 WIRELESS RECEPTION UNIT
1071 CODING UNIT
1073 MODULATION UNIT
1075 MULTIPLEXING UNIT
1077 WIRELESS TRANSMISSION UNIT
1079 DOWNLINK REFERENCE SIGNAL GENERATION UNIT
201 HIGHER LAYER PROCESSING UNIT
203 CONTROL UNIT
205 RECEPTION UNIT
207 TRANSMISSION UNIT
209 CHANNEL ESTIMATION UNIT
211 TRANSMIT AND RECEIVE ANTENNA
2051 DECODING UNIT
2053 DEMODULATION UNIT
2055 DEMULTIPLEXING UNIT
2057 WIRELESS RECEPTION UNIT
2071 CODING UNIT
2073 MODULATION UNIT
2075 MULTIPLEXING UNIT
2077 WIRELESS TRANSMISSION UNIT
2079 UPLINK REFERENCE SIGNAL GENERATION UNIT

The invention claimed is:

1. A terminal device comprising:
a controller; and
a transmitter, wherein
in a case that (i) the terminal device supports a band combination including a frequency division duplex (FDD) band and a time division duplex (TDD) band, (ii) a secondary cell belongs to the FDD band and (iii) a primary cell belongs to the TDD band, the transmitter transmits first capability information indicating whether or not the terminal device supports simultaneous reception and transmission, on different bands each in respective different duplex modes, for the band combination, and
in a case that (i) the terminal device supports a band combination including an FDD band and a TDD band, (ii) a primary cell belongs to the FDD band, and (iii) a secondary cell belongs to the TDD band, the transmitter transmits second capability information indicating whether or not the terminal device supports simultaneous reception and transmission, on different bands each in respective different duplex modes, for the band combination.

2. The terminal device according to claim 1, wherein
the controller is configured to control a transmit power of an uplink signal and a transmission of hybrid auto repeat request-acknowledgement (HARQ-ACK) based on (i) a frame structure type of a serving cell and (ii) the first and the second capability information, and
the transmitter is configured to transmit the uplink signal and/or the HARQ-ACK.

3. The terminal device according to claim 2, wherein
the controller is configured to determine uplink (UL)-reference uplink/downlink (UL/DL) configuration for a control of the transmit power based on an UL/DL configuration for a serving cell of the TDD band.

4. The terminal device according to claim 2, wherein
the controller is configured to control the transmit power of the uplink signal based on a first parameter associated with subframe sets.

5. The terminal device according to claim 2, wherein
the uplink signal including at least a physical uplink shared channel (PUSCH).

6. A method for a terminal device comprising:
transmitting first capability information in a case that (i) the terminal device supports a band combination including a frequency division duplex (FDD) band and a time division duplex (TDD) band, (ii) a secondary cell belongs to the FDD band, and (iii) a primary cell belongs to the TDD band the first capability information indicating that the terminal device supports simultaneous reception and transmission, on different bands each in respective different duplex modes, for the band combination; and
transmitting second capability information in a case that (i) the terminal device supports a band combination including an FDD hand and a TDD band, (ii) a primary cell belongs to the FDD band, and (iii) a secondary cell belongs to the TDD band, the first capability information indicating that the terminal device supports simultaneous reception and transmission, on different bands each in respective different duplex modes, for the band combination.

7. The method according to claim 6, further comprising:
determining, based on an uplink/downlink (UL/DL) configuration for a serving cell of the TDD band, an uplink (UL)-reference UL/DL configuration for a control of a transmit power of an uplink signal, the control being based on (i) a frame structure type of a serving cell and (ii) the first and the second capability information.

* * * * *